(12) United States Patent
Yamahara

(10) Patent No.: US 9,294,555 B2
(45) Date of Patent: Mar. 22, 2016

(54) INFORMATION PROCESSING APPARATUS, INFORMATION PROCESSING METHOD, INFORMATION PROCESSING PROGRAM AND RECORDING MEDIUM RECORDING INFORMATION PROCESSING PROGRAM THEREIN

(75) Inventor: Hisanori Yamahara, Shinagawa-ku (JP)

(73) Assignee: Rakuten, Inc., Tokyo (JP)

( * ) Notice: Subject to any disclaimer, the term of this patent is extended or adjusted under 35 U.S.C. 154(b) by 0 days.

(21) Appl. No.: 14/347,142

(22) PCT Filed: Apr. 4, 2012

(86) PCT No.: PCT/JP2012/059201
§ 371 (c)(1),
(2), (4) Date: Mar. 25, 2014

(87) PCT Pub. No.: WO2013/046771
PCT Pub. Date: Apr. 4, 2013

(65) Prior Publication Data
US 2014/0229575 A1  Aug. 14, 2014

(30) Foreign Application Priority Data
Sep. 30, 2011 (JP) .................................. 2011-218603

(51) Int. Cl.
| G06F 15/16 | (2006.01) |
| H04L 29/08 | (2006.01) |
| G06Q 10/06 | (2012.01) |
| G06Q 10/10 | (2012.01) |
(Continued)

(52) U.S. Cl.
CPC ................ *H04L 67/10* (2013.01); *G06Q 10/06* (2013.01); *G06Q 10/06314* (2013.01); *G06Q 10/107* (2013.01)

(58) Field of Classification Search
CPC ............ G06Q 10/06; G06Q 10/06314; G06Q 10/107; H04L 67/10
See application file for complete search history.

(56) References Cited

U.S. PATENT DOCUMENTS

| 8,326,698 | B1 * | 12/2012 | Tam et al. ................... 705/26.41 |
| 2009/0030765 | A1 * | 1/2009 | Cameron et al. .................. 705/8 |

(Continued)

FOREIGN PATENT DOCUMENTS

| JP | 2002-169939 A | 6/2002 |
| JP | 2002-245302 A | 8/2002 |

(Continued)

OTHER PUBLICATIONS

Translation of International Preliminary Report on Patentability dated Apr. 10, 2014 issued in Application No. PCT/JP2012/059201.
International Search Report for PCT/JP2012/059201 dated May 1, 2012.

*Primary Examiner* — Wen-Tai Lin
(74) *Attorney, Agent, or Firm* — Sughrue Mion, PLLC

(57) ABSTRACT

It is an object to provide an information processing apparatus and the like capable of, even when an initial application cannot be accepted, presenting an alternative to the application to an applicant so that the applicant can easily apply the alternative.

When the contents of an initial application are grasped from received transmission data and it is judged that the application cannot be accepted, reply data containing transmission destination information capable of identifying an alternative to the application is created and the created reply data is transmitted to the transmission source of the transmission data.

13 Claims, 22 Drawing Sheets

(51) Int. Cl.
*G06Q 50/00* (2012.01)
*G06Q 10/00* (2012.01)
*G06Q 30/00* (2012.01)

(56) References Cited

U.S. PATENT DOCUMENTS

2011/0040634 A1* 2/2011 Landsberry ............ G06Q 30/02
 705/14.69
2013/0262268 A1* 10/2013 Gromoll et al. ............ 705/26.61

FOREIGN PATENT DOCUMENTS

| JP | 2003-108839 | A | | 4/2003 |
| JP | 2003-208473 | A | | 7/2003 |
| JP | 2008077528 | | * | 3/2008 |
| JP | 2008-077528 | A | | 4/2008 |
| JP | 2008-129680 | A | | 6/2008 |
| JP | 2009070063 | | * | 2/2009 |
| JP | 2009-070063 | A | | 4/2009 |

* cited by examiner

| User DB 121 |
|---|
| user ID |
| name |
| e-mail address |
| phone number |
| ⋮ |

FIG. 3

| User schedule DB 122 |
|---|
| user ID |
| schedule ID |
| title |
| place |
| time zone |
| ⋮ |

FIG. 4

| Conference room DB 123 |
|---|
| conference room ID |
| e-mail address |
| capacity |
| ⋮ |

| Reservation management DB |
| --- |
| reservation ID |
| conference room ID |
| reserved use time zone |
| user ID of a reservation applicant |
| number of users |
| user ID of user other than reservation applicant(1) |
| ⋮ |
| user ID of user other than reservation applicant(k) |
| ⋮ |

| Reply e-mail management DB |
| --- |
| reply e-mail management ID |
| e-mail address corresponding to first alternative(1) |
| ⋮ |
| e-mail address corresponding to k-th alternative(k) |
| expiration of the e-mail address |
| reservation ID corresponding to first alternative(1) |
| ⋮ |
| reservation ID corresponding to k-th alternative(k) |
| ⋮ |

FIG. 7

Performed processing acquisition table

| Case | conference room NG flag | capacity NG flag | user NG flag | Processing to be performed | alternative conference room | use time zone |
|---|---|---|---|---|---|---|
| 1 | ON | ON | ON | search A processing | change | change |
| 2 | ON | ON | OFF | search B processing | change | non-change |
|   |    |    |     | search A processing | change | change |
| 3 | ON | OFF | ON | search C processing | non-change | change |
|   |    |     |    | search A processing | change | change |
| 4 | ON | OFF | OFF | search C processing | non-change | change |
|   |    |     |     | search B processing | change | non-change |
|   |    |     |     | search A processing | change | change |
| 5 | OFF | OFF | ON | search C processing | non-change | change |
|   |     |     |    | search A processing | change | change |
| 6 | OFF | ON | OFF | search B processing | change | non-change |
|   |     |    |     | search A processing | change | change |
| 7 | OFF | ON | ON | search A processing | change | change |

FIG. 16

| User DB 121A |
|---|
| user ID |
| name |
| e-mail address |
| address |
| phone number |
| credit card information |
| ⋮ |

FIG. 20

| Service DB 123A |
|---|
| service ID |
| e-mail address |
| service name |
| price |
| ⋮ |

FIG. 21

| Reservation management DB 124A |
|---|
| reservation ID |
| service ID |
| reserved use time zone |
| user ID of reservation applicant |
| ⋮ |

| Product DB |
|---|
| product ID |
| e-mail address |
| product name |
| price |
| number of stocks |
| ⋮ |

| Order management DB |
|---|
| order ID |
| product ID |
| number of ordered products |
| delivery date/delivery time zone |
| user ID of orderer |
| ⋮ |

| Reply e-mail management DB |
|---|
| reply e-mail management ID |
| e-mail address corresponding to first alternative(1) |
| ⋮ |
| e-mail address corresponding to k-th alternative(k) |
| expiration of the e-mail address |
| Order ID corresponding to first alternative(1) |
| ⋮ |
| Order ID corresponding to k-th alternative(k) |
| ⋮ |

FIG. 25

INFORMATION PROCESSING APPARATUS, INFORMATION PROCESSING METHOD, INFORMATION PROCESSING PROGRAM AND RECORDING MEDIUM RECORDING INFORMATION PROCESSING PROGRAM THEREIN

CROSS REFERENCE TO RELATED APPLICATIONS

This application is a National Stage of International Application No. PCT/JP2012/059201 filed Apr. 4, 2012, claiming priority based on Japanese Patent Application No. 2011-218603, filed Sep. 30, 2011, the contents of all of which are incorporated herein by reference in their entirety.

TECHNICAL FIELD

The present invention relates to a technical field of information processing apparatuses and the like by which an applicant can easily apply an application target.

BACKGROUND ART

Conventionally, shopping using shopping sites configured of web pages is widely used. In this situation, Patent Literature 1 discloses therein a technique by which an orderer can easily order a product via e-mail. Specifically, the technique is such that a server receives an e-mail with an e-mail address containing a product code of an ordered product as a transmission destination from an orderer's terminal device and identifies the ordered product from the product code contained in the transmission destination address of the received e-mail.

CITATION LIST

Patent Literature

Patent Literature 1: JP 2008-129680 A

SUMMARY OF INVENTION

Technical Problem

When an order is accepted via e-mail, however, unlike when an order is accepted via a shopping site, the orderer makes an order although he/she cannot confirm a stock in many cases, and the order is not less likely to be accepted. Patent Literature 1 does not describe how to cope with the case. This is applicable to any applications such as reserving a service or saving resources (such as facilities or persons), not limited to ordering a product.

The present invention has been made in terms of the above problems, and it is an object thereof to provide an information processing apparatus and the like by which even when an initial application cannot be accepted, an alternative to the application is presented to an applicant and the applicant can easily apply the alternative.

Solution to Problem

In order to solve the above problems, the invention according to a first aspect is an information processing apparatus comprising a receiving means that receives transmission data destined to transmission destination information capable of identifying an application target and transmitted in unidirectional communication, a reply data creation means that, when an application of the application target identified by the transmission destination information of the transmission data received by the receiving means cannot be accepted, creates reply data containing transmission destination information capable of identifying an alternative, and a transmission means that transmits the reply data created by the reply data creation means to the transmission source of the transmission data.

According to the invention, even when an application of the application target cannot be accepted, the reply data containing the transmission destination information capable of identifying the application target of the alternative is transmitted to the transmission source, and thus the applicant can easily apply the alternative application target by only transmitting retransmission data to the transmission destination information contained in the reply data.

Transmission of the transmission data performed in the invention according to the first aspect employs unidirectional (one-way, unidirectional) communication, not bidirectional communication with http (HyperText Transfer Protocol), https (Hypertext Transfer Protocol over Secure Socket Layer) or the like. Specifically, data communication via e-mails, SMS (Short Message Service) data communication or the like is employed.

"Application" in the invention according to the first aspect includes "order" of a product, "reservation" of a service (for example, hair dressing, medical service such as diagnosis/treatment, provision of food and drink, provision of accommodation, provision of various facilities (sports facility and entertainment facility), and various delivery services), "securement" of resources (such as conference room, OA appliance and human resources).

The invention according to a second aspect is the information processing apparatus according to the first aspect, wherein the receiving means further receives retransmission data destined to the transmission destination information capable of identifying the alternative, and the apparatus further includes an application acceptance means that accepts an application of an application target of the alternative identified by the transmission destination information of the retransmission data received by the receiving means.

According to the invention, an application of the application target of the alternative designated by the applicant can be accepted.

The invention according to a third aspect is the information processing apparatus according to the second aspect, further comprising a temporary application registration means that registers a temporary application of the application target of the alternative identified by the transmission destination information contained in the created reply data, and a temporary application cancel means that cancels the temporary application after a predetermined time elapses since the temporary application is registered, wherein when the application target of the alternative identified by the transmission destination information of the retransmission data received by the receiving means is temporarily registered, determines the temporary application as a formal application.

According to the invention, a temporary application is canceled after a predetermined period elapses since the temporary application is registered, and thus the application target of the alternative does not need to be kept in the temporarily applied state for a while, thereby avoiding a situation in which other applicant cannot have a chance to make an application.

The invention according to a fourth aspect is the information processing apparatus according to the third aspect, wherein the reply data creation means creates reply data containing a plurality of items of transmission destination information capable of identifying alternatives, the temporary application registration means registers a temporary application of an application target of each alternative identified by transmission destination information contained in the created reply data, and when the application target temporarily registered by the application acceptance means is determined as a formal application, the temporary application cancel means cancels a temporary application of other application target temporarily registered at the same time with the application target.

According to the invention, the temporary applications of the alternatives which are not designated by the applicant among the alternatives presented to the applicant are canceled when the application of the alternative designated by the applicant is determined as a formal application, and thus do not need to be kept in the temporarily applied state for a while, thereby avoiding a situation in which other applicant cannot have a chance to make an application.

The invention according to a fifth aspect is the information processing apparatus according to any one of the second to fourth aspects, wherein the alternative contains application conditions, and the reply data creation means generates transmission destination information capable of identifying the alternative, and creates reply data containing the generated transmission destination information.

According to the invention, an alternative containing application conditions can be proposed to the applicant, and the applicant can easily apply the alternative by only transmitting retransmission data to the transmission destination information contained in the reply data.

The invention according to a sixth aspect is the information processing apparatus according to the fifth aspect, further comprising a transmission destination information management means that can receive retransmission data destined to the transmission destination information generated by the reply data creation means and cannot receive retransmission data destined to the generated transmission destination information after a predetermined time elapses.

According to the invention, the transmission destination information does not need to be managed in order to be able to receive the retransmission data destined to the transmission destination information contained in the reply e-mail for a while.

The invention according to a seventh aspect is the information processing apparatus according to any one of the first to sixth aspects, wherein the receiving means receives the transmission data containing a further application condition, the apparatus further comprises a search means that, when an application of the application target identified by the transmission destination information of the transmission data received by the receiving means cannot be accepted under the application condition contained in the transmission data, searches an acceptable alternative in which at least one of the application target and the application condition is changed, and the reply data creation means creates reply data containing the transmission destination information capable of identifying the alternative searched by the search means.

According to the invention, even when an application with the application target and the application condition contained in the reply data cannot be accepted, an acceptable alternative in which at least one of the application target and the application condition is changed can be presented to the applicant, and the applicant can easily and accurately apply the alternative by only transmitting retransmission data to the transmission destination information contained in the reply data.

The invention according to an eighth aspect is the information processing apparatus according to the seventh aspect, wherein the receiving means receives the transmission data containing identification information capable of identifying other application target to be applied with the application target, and when the application target identified by the transmission destination information of the transmission data received by the receiving means and other application target identified by the identification information contained in the transmission data cannot be accepted under the application condition contained in the transmission data, the search means searches an acceptable alternative in which the application target and the other application target can be accepted under the same condition without changing the other application target.

According to the invention, when the application target and other application target cannot be accepted under the application condition contained in the transmission data, an alternative in which the application target and the other application target can be accepted under the same application condition without changing the other application target can be presented to the applicant, and the applicant can easily apply the alternative by only transmitting retransmission data to the transmission destination information contained in the reply data.

The invention according to a ninth aspect is the information processing apparatus according to the eighth aspect, wherein the application target is a specific resource, the other application target is a plurality of users utilizing the resource, the application condition is a use period containing a use start time/date and a use end time/date of the resource, and when a judgment is made as to whether the other application target can be accepted under the same application condition, the search means assumes, as an application condition, at least either the use start time/date a predetermined time earlier and the use end time a predetermined time later.

According to the invention, even when another schedule is made before or after the time zone in which the resource is utilized for other application target (users utilizing the resource), a certain margin can be secured between the schedule and the time zone utilizing the resource, thereby enhancing convenience of the users utilizing the resource.

The invention according to a 10th aspect is the information processing apparatus according to any one of the second to fourth aspects, wherein the alternative contains application conditions, the reply data creation means creates reply data containing the transmission destination information capable of identifying the application target, and the application condition, and the reply data created by the reply data creation means is retransmission data destined to transmission destination information when the transmission destination information contained in the reply e-mail is designated, and further contains auxiliary data for assisting in creating the retransmission data containing the application condition to be designated by an applicant among application conditions contained in the reply e-mail.

According to the invention, when the applicant designates transmission destination information contained in the reply data by the auxiliary data contained in the reply e-mail, retransmission data destined to the transmission destination indicated by the transmission destination information and containing the application condition to be designated by the applicant is created. Thereby, the information processing apparatus can identify the application target of the alternative from the transmission destination information as the transmission destination of the retransmission data and identify the application condition of the alternative from the application condition contained in the retransmission data. The applicant can create the retransmission data by only selecting the transmission destination information contained in the reply data, thereby easily apply the alternative.

The invention according to an 11th aspect is an information processing method performed by a computer, comprising a reception step of receiving transmission data destined to transmission destination information capable of identifying an application target and transmitted in unidirectional communication, a reply data creation step of, when an application of the application target identified by the transmission destination information of the transmission data received in the reception step cannot be accepted, creating reply data containing transmission destination information capable of identifying an alternative, and a transmission step of transmitting the reply data created in the reply data creations step to the transmission source of the transmission data.

The invention according to a 12th aspect is a recording medium computer-readably recording an information processing program therein, the program for causing a computer to function as a receiving means that receives transmission data destined to transmission destination information capable of identifying an application target and transmitted in unidirectional communication, a reply data creation means that, when an application of the application target identified by the transmission destination information of the transmission data received by the receiving means cannot be accepted, creates reply data containing transmission destination information capable of identifying an alternative, and a transmission means that transmits the reply data created by the reply data creation means to the transmission source of the transmission data.

The invention according to a 13th aspect is an information processing program for causing a computer to function as a receiving means that receives transmission data destined to transmission destination information capable of identifying an application target and transmitted in unidirectional communication, a reply data creation means that, when an application of the application target identified by the transmission destination information of the transmission data received by the receiving means cannot be accepted, creates reply data containing transmission destination information capable of identifying an alternative, and a transmission means that transmits the reply data created by the reply data creation means to the transmission source of the transmission data.

Advantageous Effects of Invention

According to the present invention, even when an application for an application target cannot be accepted, reply data containing transmission destination information capable of identifying an alternative to the application is transmitted to the transmission source and thus an applicant can easily make an application only by transmitting retransmission data to the destination indicated by the transmission destination information contained in the reply data.

BRIEF DESCRIPTION OF DRAWINGS

FIG. 3 is a diagram illustrating exemplary contents (items) registered in a user DB 121.

FIG. 4 is a diagram illustrating exemplary contents (items) registered in a user schedule DB 122.

FIG. 5 is a diagram illustrating exemplary contents (items) registered in a conference room DB 123.

FIG. 6 is a diagram illustrating exemplary contents (items) registered in a reservation management DB 124.

FIG. 7 is a diagram illustrating exemplary contents (items) registered in a reply e-mail management DB 125.

FIG. 16 is a diagram illustrating an exemplary performed processing acquisition table to be referred to in the alternative search processing.

FIG. 20 is a diagram illustrating exemplary contents (items) registered in a user DB 121A according to a variant.

FIG. 21 is a diagram illustrating exemplary contents (items) registered in a service DB 123A according to the variant.

FIG. 22 is a diagram illustrating exemplary contents (items) registered in a reservation management DB 124A according to the variant.

FIG. 23 is a diagram illustrating exemplary contents (items) registered in a product DB 123B according to the variant.

FIG. 24 is a diagram illustrating exemplary contents (items) registered in an order management DB 124B according to the variant.

FIG. 25 is a diagram illustrating exemplary contents (items) registered in a reply e-mail management DB 125B according to the variant.

DESCRIPTION OF EMBODIMENT

An embodiment according to the present invention will be described below with reference to the drawings. The embodiment described below is when the present invention is applied to a conference room reservation system.

[1. Structure and Functional Outline of Conference Room Reservation System]

A structure and outline functions of a conference room reservation system S according to one embodiment of the present invention will be first described with reference to FIG. 1.

Figure 1:
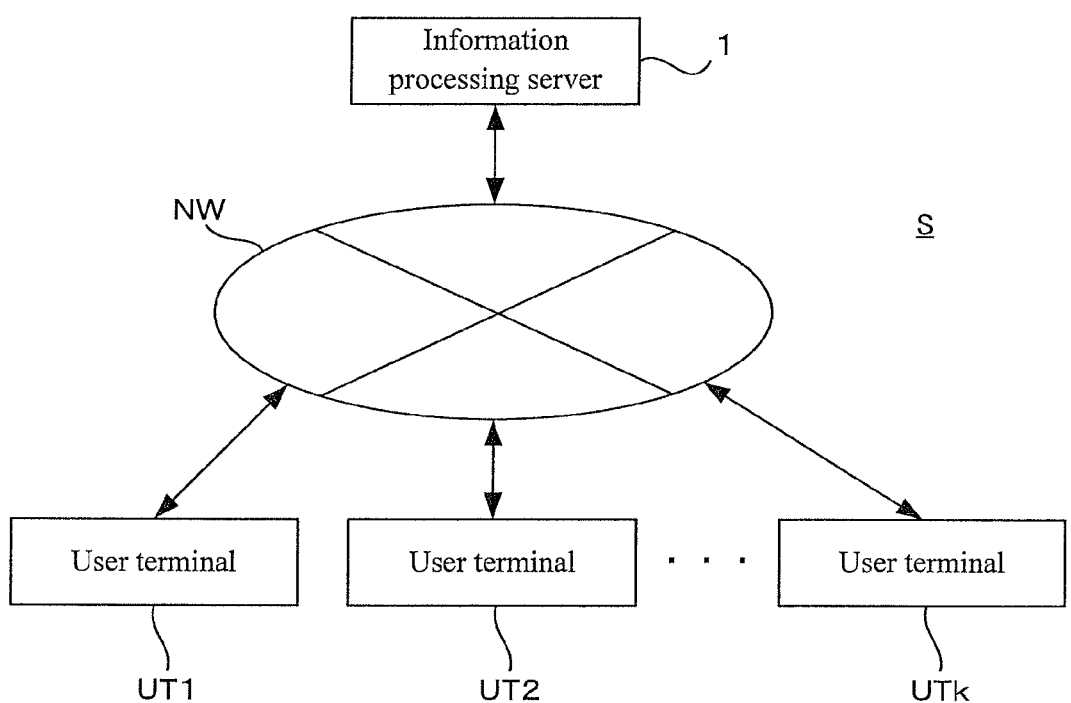
FIG. 1 is a diagram illustrating an exemplary outline structure of a conference room reservation system S according to an embodiment.

FIG. 1 is a diagram illustrating an exemplary outline structure of the conference room reservation system S according to the present embodiment. As illustrated in FIG. 1, the conference room reservation system S is configured of a plurality of user terminals UTn (n=1, 2, 3, . . . k) and an information processing server (exemplary information processing apparatus) 1. The user terminals UTn and the information processing server 1 are connected to a network NW, respectively. The network NW is constructed of Internet, a dedicated communication line (such as CATV (Community Antenna Television) line), a mobile communication network (including base station and the like), a gateway, or the like.

The user terminal UTn has a function of exchanging e-mails. The user terminal UTn has a function of receiving an e-mail transmitted to a predetermined e-mail address from an e-mail server and displaying it on a display, and transmitting an e-mail to a designated e-mail address by application software for exchanging and managing e-mails (which will be denoted as "e-mail software" below).

The information processing server 1 is installed for managing reservations of conference rooms, for example, and functions as an e-mail server, a reply e-mail generation server, a reservation management server, a database management server and the like, for example.

A user of a user terminal UTn (which will be denoted as "reservation applicant" below) can easily reserve a conference room via an e-mail with the conference room reservation system S. Specifically, at first the reservation applicant creates an e-mail (which will be denoted as "reservation application e-mail" below) with an e-mail address corresponding to a conference room to be reserved as a transmission destination from among the e-mail addresses defined per conference room, fills a use time zone to be reserved in the reservation application e-mail and transmits the same. The information processing server 1 receiving the reservation application e-mail judges whether the reservation can be accepted, and when the reservation can be accepted, transmits a reply e-mail (which is called "acceptance e-mail") describing that the reservation is accepted to the transmission source address. On the other hand, when the reservation cannot be accepted, the information processing server 1 transmits a reply e-mail containing at least one alternative to the transmission source address. The reply e-mail containing alternatives describes e-mail addresses associated with the respective alternatives, and when the reservation applicant accepts any alternative, he/she transmits an e-mail with the e-mail address associated with the alternative as a transmission destination (which will be denoted as "retransmission e-mail" below). Then, the information processing server 1 specifies the alternative designated by the reservation applicant from the e-mail address as the destination of the received retransmission e-mail, and determines a reservation of the alternative. The information processing server 1 is such that until the reservation applicant designates an alternative and retransmits a retransmission e-mail after making a temporary reservation for a while for the alternative contained in the reply e-mail, the conference room as the alternative cannot be reserved by other reservation applicant. Thereby, the reservation applicant can easily reserve a conference room with only exchange of e-mails.

[2. Structure of Information Processing Server 1]

Figure 2:
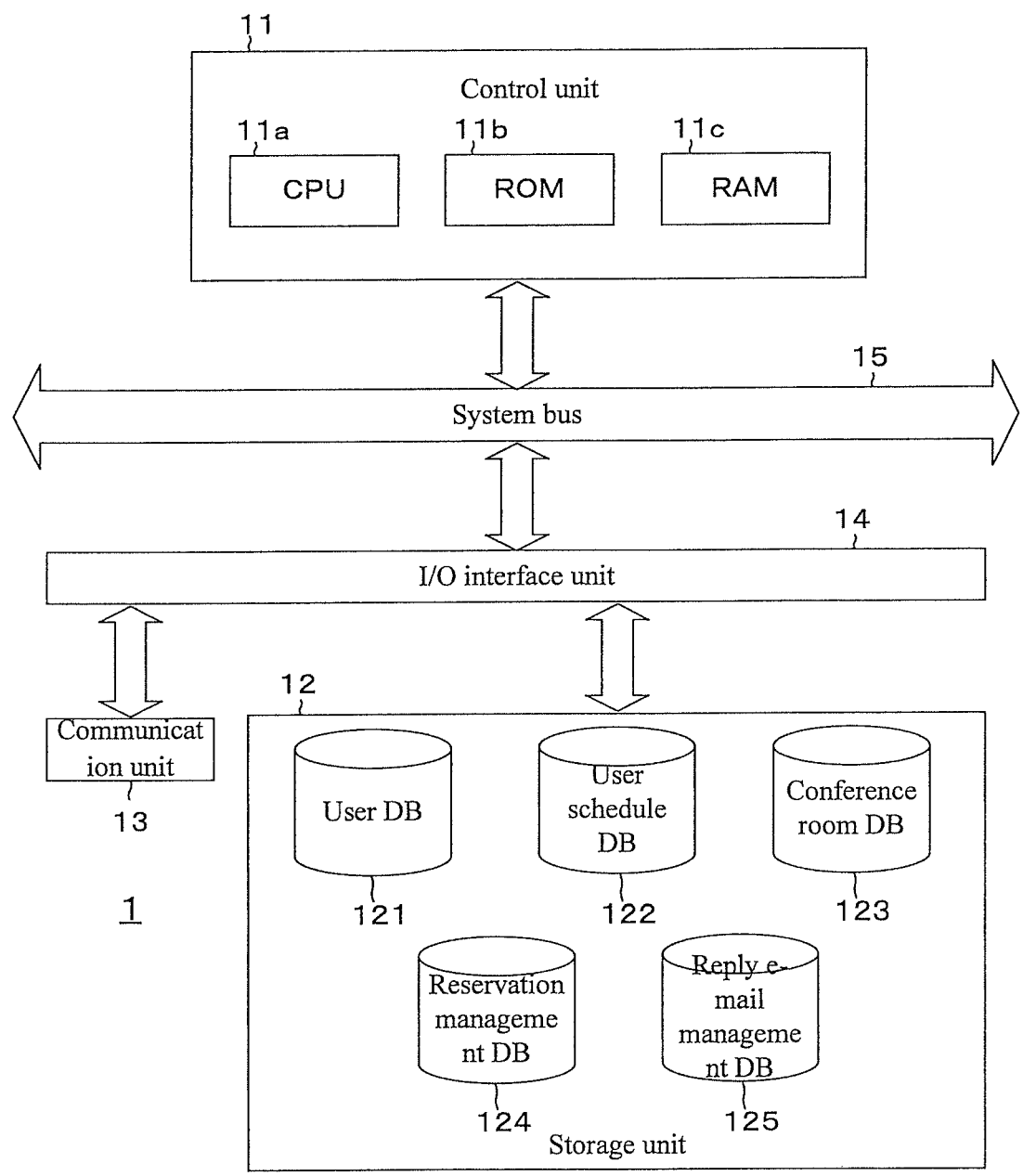
FIG. 2 is a block diagram illustrating an exemplary outline structure of an information processing server 1 according to the embodiment.

FIG. 2 is a block diagram illustrating an exemplary outline structure of the information processing server 1 according to the present embodiment. As illustrated in FIG. 2, the information processing server 1 comprises a control unit 11, a storage unit 12, a communication unit 13, and an I/O interface unit 14. The control unit 11 is connected with the I/O interface unit 14 via a system bus 15.

The communication unit 13 is connected to the network NW to control communication for exchanging e-mails with other e-mail servers.

The storage unit 12 is configured of a hard disc drive or the like, for example, and stores various programs such as operating system and server programs (exemplary "information processing programs") therein. The server programs may be distributed from a predetermined server or the like via the network NW, or may be recorded in a recording medium such as CD (Compact Disc) or DVD (Digital Versatile Disc) to be provided.

Further, the storage unit 12 constructs therein a user database (DB) 121, a user schedule DB 122, a conference room DB 123, a reservation management DB 124 and a reply e-mail management DB 125.

FIG. 3 to FIG. 7 are the diagrams illustrating exemplary contents (items) registered in various databases.

As illustrated in FIG. 3, the user DB 121 registers (stores) name of a user utilizing a conference room or the conference room reservation system S, e-mail address, phone number and the like in association with a user ID. The e-mail address registered in the user DB 121 is a transmission source of an e-mail to be transmitted when the reservation applicant utilizes the conference room reservation systems S.

The user schedule DB 122 registers (stores) therein schedules of a user utilizing a conference room or the conference room reservation system S. Specifically, as illustrated in FIG. 4, scheduled title, place and time zone are registered in association with a user ID and a schedule ID. The control unit 11 designates a user ID thereby to acquire all the registered schedules of the relevant user.

As illustrated in FIG. 5, the conference room DB 123 registers (stores) e-mail address of a conference room to be reserved in the conference room reservation system S, capacity and the like in association with a conference room ID. The e-mail addresses registered in the conference room DB 123 are specific to the conference rooms, and the conference rooms can be identified by the e-mail addresses, respectively.

As illustrated in FIG. 6, the reservation management DB 124 registers (stores) conference room ID of a reserved conference room, reserved use time zone (start time and end time), user ID of a reservation applicant, the number of users, user ID of user other than reservation applicant in association with a reservation ID. The reservation management DB 124 registers data also when a temporary reservation is made by the control unit 11 as described later, not only when the reservation is determined. A reservation ID is issued each time data is registered in the reservation management DB 124.

As illustrated in FIG. 7, the reply e-mail management DB 125 registers (stores) e-mail address generated by the control unit 11 per alternative (e-mail address corresponding to alternative), expiration of the e-mail address, reservation ID when each alternative is temporarily reserved (reservation ID corresponding to alternative), and the like in association with a reply e-mail management ID. That is, each time one reply e-mail is created, data identified by one corresponding reply e-mail management ID can be registered. At this time, also when a plurality of alternatives are provided, the control unit 11 registers an e-mail address corresponding to an alternative 1 in the e-mail address (1) and registers a reservation ID corresponding to the alternative 1 in the reservation ID (1) in order to judge a correspondence among the alternative, the e-mail address and the reservation ID. As described later, when the control unit 11 generates an e-mail address corresponding to an alternative, an expiration of the e-mail address is registered in the reply e-mail management DB 125 (for example, set at 23:59:59 on the day after the e-mail address is generated. Further, the time after a predetermined time (such as 24 hours) after data corresponding to the alternative is registered in the reservation management DB 124 may be set.) Also when a plurality of alternatives are present and a plurality of e-mail addresses are generated, they are managed by one expiration.

When an expired e-mail address is present, the control unit 11 disables use of the e-mail address, and deletes the data identified by the reservation ID corresponding to the e-mail address in the reply e-mail management DB 125 from the reservation management DB 124 in order to cancel the temporary reservation corresponding to the e-mail address. Thereby, the temporary reservation of a conference room which is not formally reserved by the expiration of the e-mail address is canceled, and thus the temporarily-reserved conference room does not keep temporally reserved, thereby reducing a possibility other reservation applicant cannot make a reservation.

Various databases described above may be provided in a storage means in a predetermined server accessible by the information processing server 1.

The I/O interface unit 14 performs an interface processing between the communication unit 13 as well as the storage unit 12 and the control unit 11.

The control unit 11 is configured of CPU (Central Processing Unit) 11a, ROM (Read Only Memory) 11b, RAM (Random Access Memory) 11c, and the like. The control unit 11 as a computer performs an acceptance response processing and the like by executing the server programs stored in the storage unit 12. The control unit 11 functions as a receiving means, a reply data creation means, a transmission means, an application acceptance means, a temporary reservation registration means, a temporary application cancel means, a transmission destination information management means, and a search means.

[3. Structure of User Terminal UTn]

Figure 8:
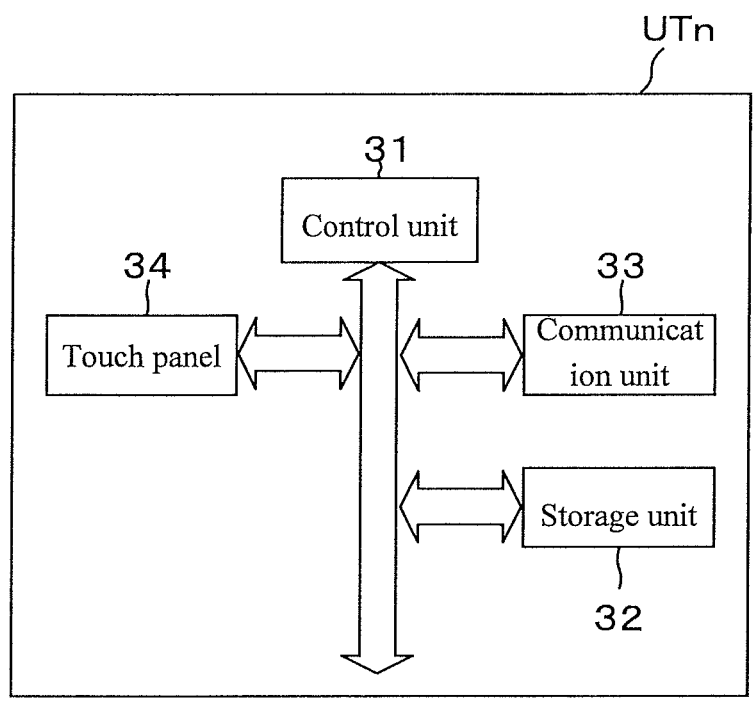
FIG. 8 is a block diagram illustrating an exemplary outline structure of a user terminal UTn according to the embodiment.

The user terminal UTn comprises a control unit 31 having CPU, RAM, ROM and the like, a storage unit 32, a communication unit 33 for controlling communication with e-mail servers via the network, and a touch panel 34 as illustrated in FIG. 8. The storage unit 32 stores therein various programs such as operating system, e-mail software, and application software for managing an address book (which will be denoted as "address book software" below). The touch panel 34 is configured of a capacitive touch panel and a display device, and functions as an operation unit and a display unit. The user terminal UTn employs a personal computer (PC), a PDA (Personal Digital Assistant), a cell phone, a Smartphone or the like.

[4. Operations of Information Processing Server 1]

[4.1. Acceptance Response Processing]

Figure 9:
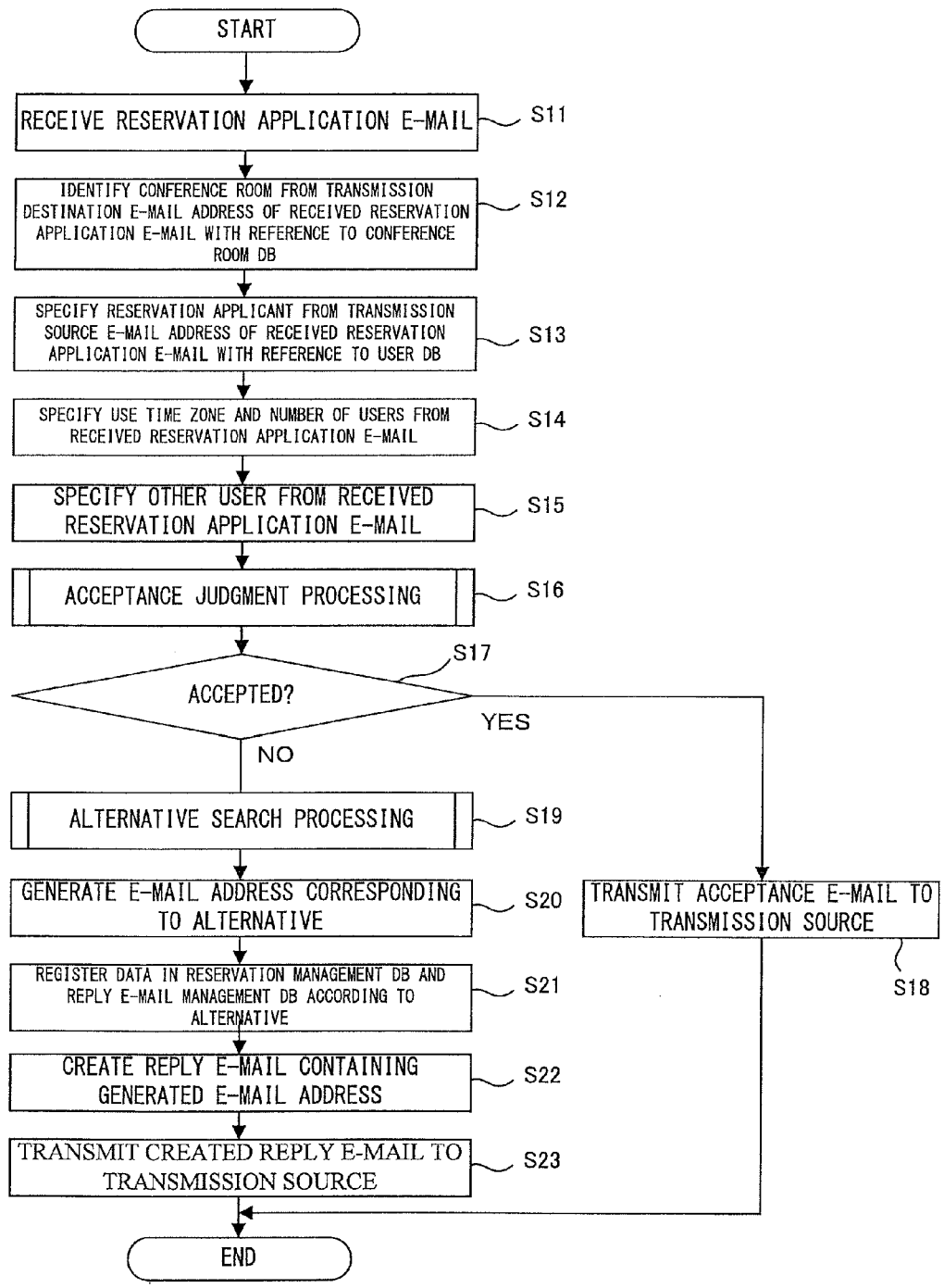
FIG. 9 is a flowchart illustrating an exemplary acceptance response processing by a control unit 11 in the information processing server 1.

An acceptance response processing by the control unit 11 in the information processing server 1 will be described below with reference to FIG. 9 and the like. FIG. 9 is a flowchart illustrating the acceptance response processing by the control unit 11 in the information processing server 1.

The flowchart illustrated in FIG. 9 starts with a step (step S11) in which the information processing server 1 receives a reservation application e-mail from the user terminal UTn of the reservation applicant, but a flow of transmission of the reservation application e-mail by the reservation applicant will be first described with reference to FIG. 10 and the like prior to describing the processing flow illustrated in FIG. 9.

Figure 10:
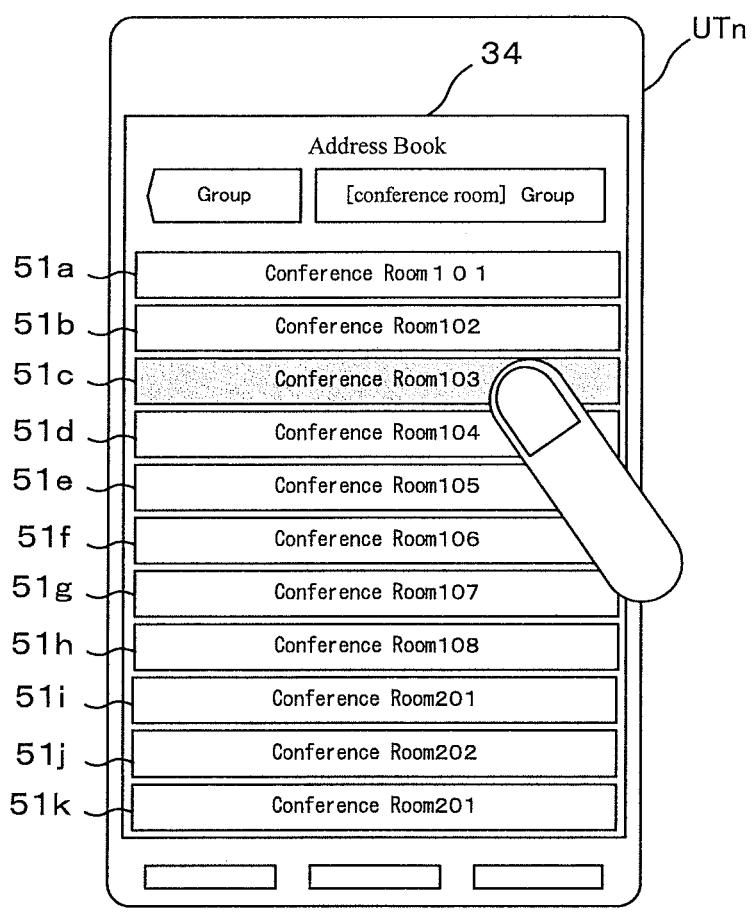
FIG. 10 is a diagram illustrating an exemplary screen when an e-mail address corresponding to a conference room to be reserved is selected from an address book.
Figure 11:
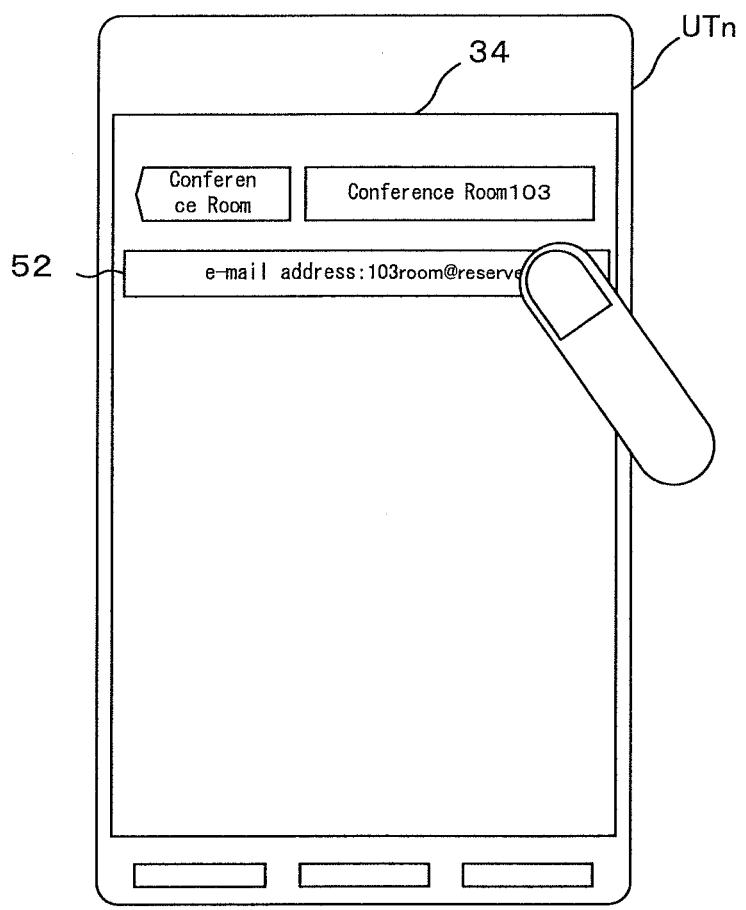
FIG. 11 is a diagram illustrating an exemplary screen when an e-mail address corresponding to a conference room to be reserved is selected from an address book.

When the reservation applicant wants to reserve a conference room, he/she activates the address book software in the user terminal UTn to display the address book on the touch panel 34 as illustrated in FIG. 10. Then, when the reservation applicant selects a conference room to be reserved (FIG. 10 illustrates that the conference room 103 is selected), the control unit 31 in the user terminal UTn switches the screen of the touch panel 34 to display the e-mail address 52 corresponding to the conference room selected by the reservation applicant as illustrated in FIG. 11. Then, when the reservation applicant selects the e-mail address display unit 52, the control unit 31 switches the screen of the touch panel 34 to display an e-mail creation screen with the e-mail address selected by the reservation applicant as transmission destination 61 as illustrated in FIG. 12.

Figure 12:
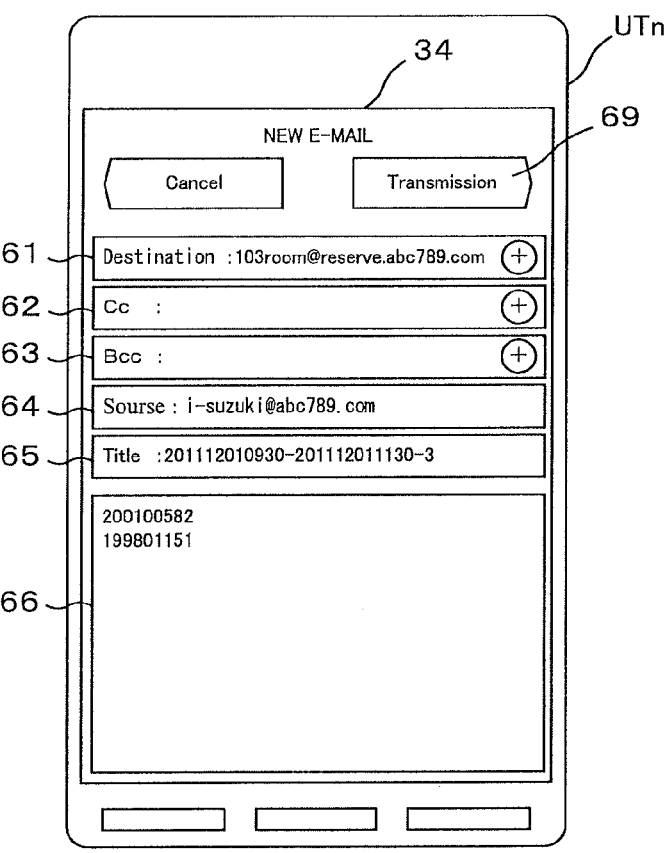
FIG. 12 is a diagram illustrating an exemplary screen when an e-mail with an e-mail address corresponding to a conference room to be reserved as a transmission destination is created.
Figure 13:
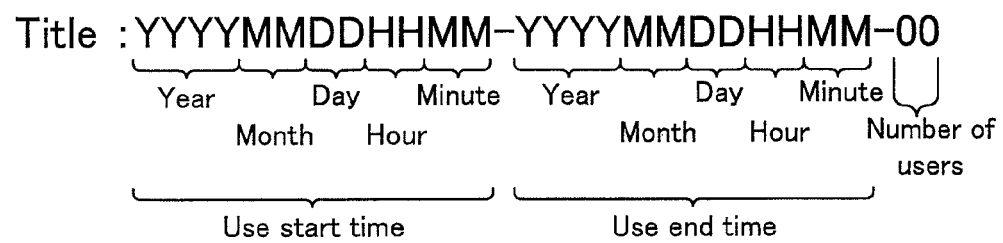
FIG. 13 is a diagram illustrating an exemplary code system for designating reservation conditions.

An e-mail address corresponding to a conference room desired to reserve by the reservation applicant is set as transmission destination 61 in the e-mail creation screen illustrated in FIG. 12. The e-mail address of the reservation applicant is set as transmission source 64. The e-mail address registered in the user DB 121 in the information processing server 1 is set as the e-mail address of the reservation applicant such that the information processing server 1 can identify the reservation applicant by the transmission source address. Conditions when the reservation applicant reserves a conference room are set in title 65. Specifically, a condition for when the reservation applicant uses the conference room and a condition for the number of users utilizing the conference room are set. More specifically, the reservation applicant designates a use start time, a use end time, and the number of users of the conference room in the form illustrated in FIG. 13. Other users (users utilizing the conference room at the same time, and participants in a conference held in the conference room, for example. The users will be denoted as "other users" below. "Other users" are exemplary "other applicants") utilizing the conference room are designated in text 66 in FIG. 12. Other users are designated in an arbitrary way, but are assumed to be designated by user IDs according to the present embodiment. It can be assumed that the reservation applicant does not know the user IDs of other users, and thus other users may be designated by the e-mail addresses of other users. Other users may be designated in the title 65. In this case, a user ID of other user may be designated by changing the form illustrated in FIG. 13 and inserting a "hyphen" after the number of users, for example. The reservation applicant may set e-mail addresses in Cc 62 and Bcc 63 as needed. Then, the reservation applicant confirms that information is correctly set in destination 61, transmission source 64, title 65 and text 66, and then selects a transmission button 69 to transmit the reservation application e-mail.

Returning to the flowchart illustrated in FIG. 9, when receiving the reservation application e-mail transmitted from the user terminal UTn as described above (step S11), the control unit 11 in the information processing server 1 identifies the conference room (conference room ID) from the transmission destination e-mail address of the received reservation application e-mail (or the e-mail address set in the destination 61 in FIG. 12) with reference to the conference room DB 123.

Then, the control unit 11 specifies the user ID of the reservation applicant from the transmission source e-mail address of the reservation application e-mail received in the processing in step S11 (step S13). Then, the control unit 11 specifies the use time zone and the number of users from the title of the reservation application e-mail received in the processing in step S11 (step S14). The control unit 11 specifies users other than the reservation applicant who transmits the reservation applicant e-mail from the text or the like of the reservation application e-mail received in the processing in step S11 (step S15). Then, the control unit 11 performs an acceptance judgment processing described with reference to FIG. 14 (step S16).

Figure 14:
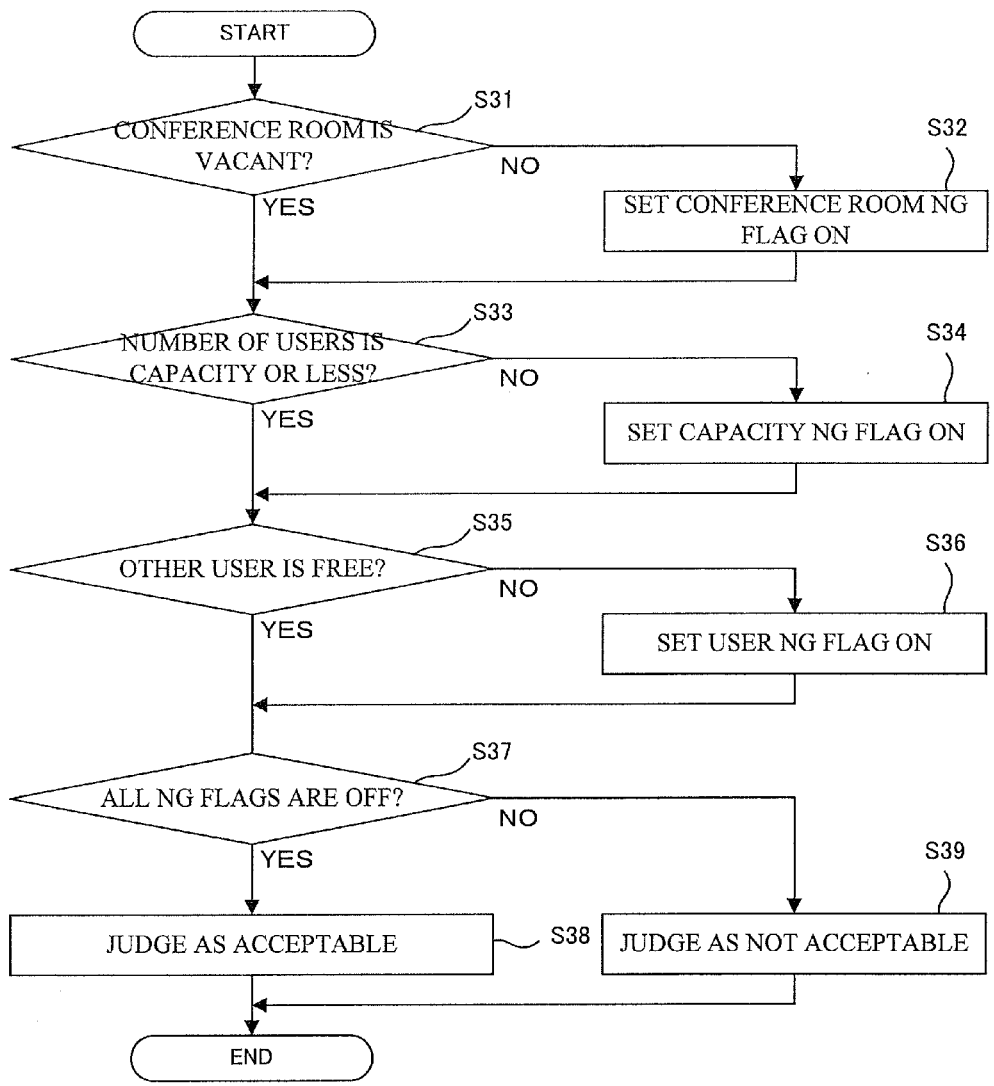
FIG. 14 is a flowchart illustrating an exemplary acceptance judgment processing by the control unit 11 in the information processing server 1.

The acceptance judgment processing will be described herein with reference to FIG. 14. FIG. 14 is a flowchart illustrating the acceptance judgment processing by the control unit 11 in the information processing server 1. The acceptance judgment processing employs three flags (conference room NG flag, capacity NG flag and user NG flag), and all of them are initialized (all the flags are OFF) until the processing illustrated in the flowchart is started.

At first, the control unit 11 judges whether the conference room identified in the processing in step S12 in FIG. 9 is vacant (step S31). Specifically, the control unit 11 confirms vacancy of the relevant conference room for the use time zone specified in the processing in step S 14 in FIG. 9 based on the conference room ID of the conference room identified in the processing in step S12 with reference to the reservation management DB 124. When judging that the conference room is not vacant (step S31: NO), the control unit 11 sets the conference room NG flag ON (step S32) and proceeds to the processing in step S33, and when judging that the conference room is vacant (step S31: YES), proceeds to the processing in step S33.

Then, the control unit 11 judges whether the number of users specified in the processing in step S14 in FIG. 9 is equal to or less than a capacity of the conference room to be reserved (step S33). Specifically, the control unit 11 acquires the capacity of the conference room and judges whether the number of users of the conference room is the acquired capacity or less based on the conference room ID of the conference room identified in the processing in step S12 with reference to the conference room DB 123. When judging that the number of users of the conference room is not the capacity or less (step S33: NO), the control unit 11 sets the capacity NG flag ON (step S34) and proceeds to the processing in step S35, and when judging that the number of users of the conference room is the capacity or less (step S33: YES), proceeds to the processing in step S35.

Then, the control unit 11 judges whether a schedule of other user specified in the processing in step S15 in FIG. 9 is not made for the use time zone specified in the processing in step S15 (step S35). Specifically, the control unit 11 judges whether a schedule is made for the use time zone specified in the processing in step S15 based on the user ID of other user identified in the processing in step S15 with reference to the user schedule DB 122. When other users are present, a confirmation is made for each user. At this time, when a schedule is not made for the use time zone designated by the reservation applicant but other schedule is earlier made at a place distant from the address of the conference room, the case may be judged as scheduled. In this case, the control unit 11 calculates a moving time from the early scheduled place registered in the user schedule DB 122 to the address of the conference room, for example, and when the moving time is longer than the time between the end time of the early schedule and the use start time, the case is judged as scheduled. Then, when judging that other use is not free (step S35: NO), the control unit 11 sets the user NG flag ON (step S36) and proceeds to the processing in step S37, and when judging that other user is free (step S35: YES), proceeds to the processing in step S37.

Then, the control unit 11 judges whether all the NG flags (conference room NG flag, capacity NG flag, and user NG flag) are OFF (step S37). At this time, when judging that all the NG flags are OFF (step S37: YES), the control unit 11 judges that the reservation can be accepted (step S38), and terminates the processing in the flowchart. On the other hand, when judging that all the NG flags are not OFF (any NG flag is ON) (step S37: NO), the control unit 11 judges that the reservation cannot be accepted (step S39) and terminates the processing in the flowchart.

Returning to FIG. 9, the control unit 11 judges whether the reservation can be accepted (step S17). That is, as a result of the acceptance judgment processing (FIG. 14), the control unit 11 judges whether the reservation is judged as acceptable. When judging as acceptable (step S17: YES), the control unit 11 transmits an acceptance e-mail to the transmission source of the e-mail received in step S11 (step S18), and terminates the processing in the flowchart. On the other hand, when judging as not acceptable (step S17: NO), the control unit 11 performs an alternative search processing described with reference to FIG. 15 (step S19).

The alternative search processing will be described herein with reference to FIG. 15. The alternative search processing is directed for searching an alternative to be presented to the reservation applicant when the application contents of the reservation applicant cannot be accepted. The alternative search method may employ any method and one example thereof will be described herein.

Figure 15:
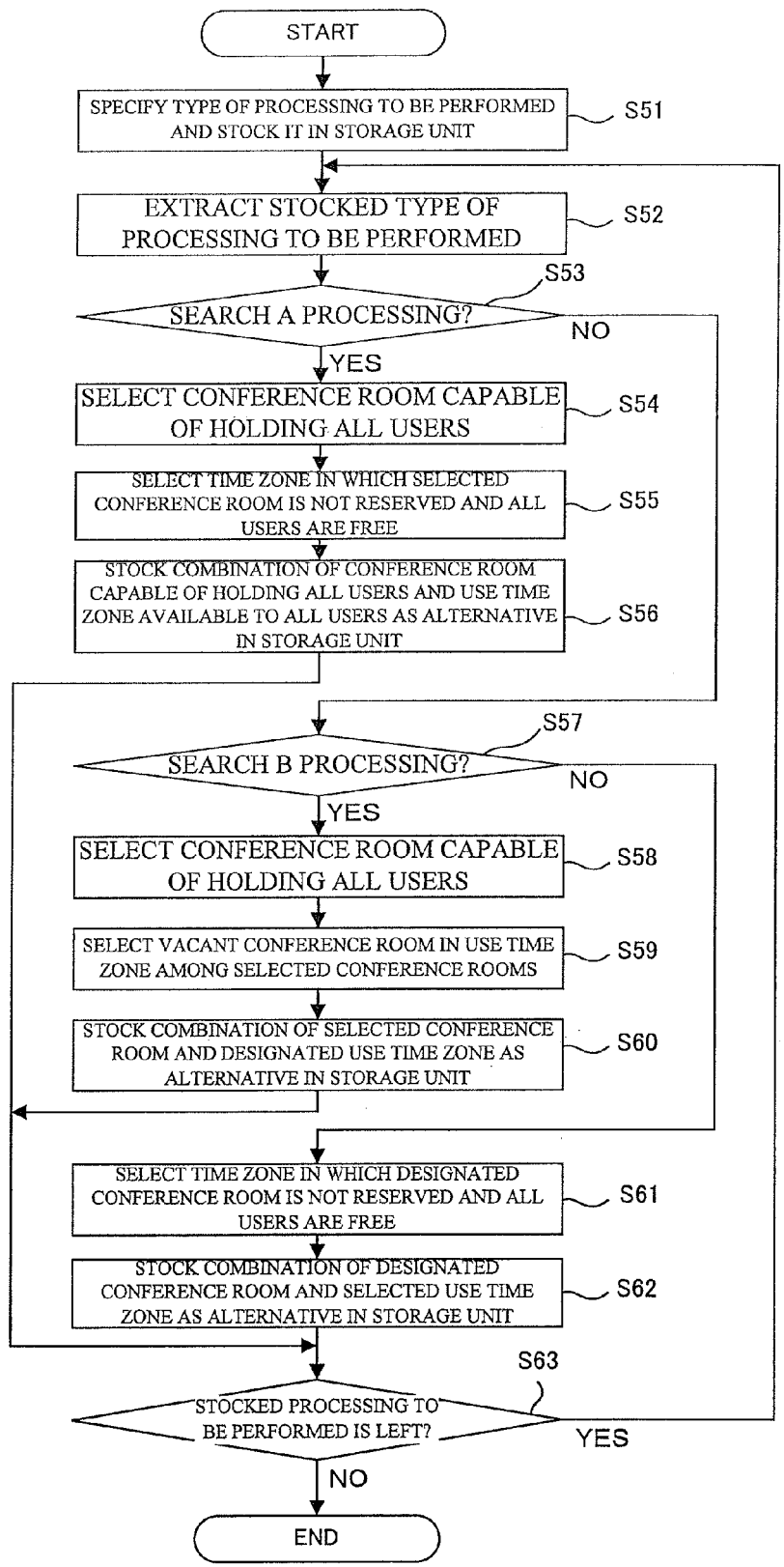
FIG. 15 is a flowchart illustrating an exemplary alternative search processing by the control unit 11 in the information processing server 1.

FIG. 15 is a flowchart illustrating the alternative search processing by the control unit 11 in the information processing server 1. The control unit 11 refers to the three flags (conference room NG flag, capacity NG flag and user NG flag) used in the acceptance judgment processing (FIG. 14) for the alternative search processing. At this time, the control unit 11 refers to the three flags in the used state in the acceptance judgment processing (FIG. 14) (or in the non-initialized state).

At first, the control unit 11 specifies a processing to be performed in the alternative search processing, and stocks a type of the processing to be performed in the storage unit 12 (step S51). Specifically, a processing to be performed is specified depending on ON/OFF of the three flags used in the acceptance judgment processing (FIG. 14) with reference to a performed processing acquisition table illustrated in FIG. 16. In the performed processing acquisition table, at least any one of a search A processing, a search B processing and a search C processing is associated as a processing to be performed for seven cases depending on ON/OFF of the three flags. FIG. 16 indicates a corresponding alternative is which alternative to changed or unchanged (non-changed) conference room and use time zone per processing to be performed as a remark on the right side of the performed processing acquisition table.

For example, the case 1 (the conference room NG flag, the capacity NG flag and the user NG flags are ON) defines that the search A processing is to be performed. In this case, an alternative searched in the search A processing (alternative to change the conference room and the use time zone) is to be presented to the reservation applicant. The case 2 (the conference room NG flag and the capacity NG flag are ON and the user NG flag is OFF) defines that the search A processing and the search B processing are to be performed. In this case, an alternative searched in the search A processing and an alternative searched in the search B processing (the conference room is changed and the use time zone is unchanged (non-changed)) are to be presented to the reservation applicant. Further, the case 4 (the conference room NG flag is ON, and the capacity NG flag and the user NG flag are OFF) defines that the search A processing, the search B processing and the search C processings are to be performed. In this case, an alternative searched in the search A processing, an alternative searched in the search B processing and an alternative searched in the search C processing (the conference room is unchanged (non-changed) and the use time zone is changed) are to be presented to the reservation applicant. The processings to be performed for other cases (the cases 3, 5, 6 and 7) are as illustrated in FIG. 16.

Returning to FIG. 15, the control unit 11 then extracts one type of a processing to be performed stocked in the processing in step S51 (step S52). Then, the control unit 11 judges whether the extracted type of the processing to be performed is the search A processing (step S53).

At this time, when judging that the type is the search A processing (step S53: YES), the control unit 11 selects a conference room having a capacity for all the users (the reservation applicant and other users) (step S54). Specifically, the control unit 11 selects all the conference rooms having a capacity of more than the users specified in the processing in step S14 in FIG. 9 with reference to the conference room DB 123.

Then, the control unit 11 selects a time zone in which the conference room selected in the processing in step S54 is not reserved and the schedules of all the users are not made as a use time zone (step S55). Specifically, the control unit 11 first acquires all the time zones in which each conference room selected in the processing in step S54 is not reserved (or can be reserved) with reference to the reservation management DB 124. At this time, the control unit 11 may acquire only a time zone for which a preset time (such as two hours) can be reserved. In this case, an improper time (such as short time of 5 minutes or longtime of 10 hours) for utilizing a conference room is not acquired, which is reasonable. The control unit 11 may acquire only a time zone within a preset time (such as 3 days) after a reservation is made. In this case, an improper time for an alternative, such as one month after a reservation is made, is not acquired, which is reasonable. Then, the control unit 11 confirms whether the schedules of all the users (the reservation applicant and other user) are not made for each previously-acquired time zone in which the conference room is not reserved. Specifically, the control unit 11 confirms whether other schedule is not made in each acquired time zone with reference to the user schedule DB 122. At this time, the control unit 11 may judge as scheduled when a schedule is made at a distant place before the acquired time zone similarly to the contents described in the processing in step S35 in FIG. 14.

Then, the control unit 11 stocks a combination of conference room capable of holding all the users and use time zone capable of being used by all the users as an alternative in the storage unit 12 based on the results of the processing in step S54 and the processing in step S55 (step S56), and proceeds to the processing in step S63.

On the other hand, when judging that the type is not the search A processing in the processing in step S53 (step S53: NO), the control unit 11 judges whether the type of the processing to be performed, which is extracted in the processing in step S52, is the search B processing (step S57).

At this time, when judging that the type is the search B processing (step S 57: YES), the control unit 11 selects all the conference rooms capable of holding all the users (the reservation applicant and other user) similarly as in step S54.

Then, the control unit 11 selects all the conference rooms vacant in the use time zone designated by the reservation applicant among the conference rooms selected in the processing in step S58 (step S59). Specifically, the control unit 11 confirms whether each conference room selected in the processing in step S58 is vacant (can be reserved) in the use time zone designated by the reservation applicant, and selects a vacant conference room with reference to the reservation management DB 124.

Then, the control unit 11 stocks a combination of conference room (conference room ID) selected in the processing in step S59 and use time zone designated by the reservation applicant as an alternative in the storage unit 12 (step S60), and proceeds to the processing in step S63.

On the other hand, when judging that the type is not the search B processing in the processing in step S57 (step S57: NO) or when the search C processing is extracted in the processing in step S52, the control unit 11 selects, as a use time zone, a time zone in which the conference room which is applied to reserve by the reservation applicant is not reserved and the schedules of all the users (the reservation applicant and other user) are not made (step S61). Specifically, the control unit 11 first acquires all the time zones in which the conference room which is applied to reserve is not reserved (or can be reserved) with reference to the reservation management DB 124. At this time, the control unit 11 may acquire only a time zone in which a preset time can be reserved or may acquire only a time zone within a preset time after a reservation is made similarly to the contents described in the processing in step S55. The control unit 11 confirms whether the schedules of all the users are not made for each previously-acquired time zone in which the conference room is not reserved. Specifically, the control unit 11 confirms that each user does not make a schedule in each acquired time zone with reference to the user schedule DB 122. At this time, the control unit 11 may judge as scheduled when a schedule is made at a distance place before the acquired time zone similarly to the contents described in the processing in step S35 in FIG. 14.

Then, the control unit 11 stocks a combination of conference room (conference room ID) designated by the reservation applicant and use time zone selected in the processing in step S61 as an alternative in the storage unit 12 (step S62), and proceeds to the processing in step S63.

When terminating the processing in step S56, the processing in step S60 or the processing in step S62, the control unit 11 judges whether a type of the processing to be performed, which is stocked in the storage unit 12, is left (step S63). At this time, when judging that a type of the processing to be performed, which is stocked in the storage unit 12, is left (step S63: YES), the control unit 11 proceeds to the processing in step S52 and repeats the processings in step S52 to step S63 until all the types of the processings to be performed are extracted. On the other hand, when judging that a type of the processing to be performed, which is stocked in the storage unit 12, is not left (step S63: NO), the control unit 11 terminates the processing in the flowchart.

Returning to FIG. 9, the control unit 11 generates an e-mail address corresponding to an alternative (step S20). Specifically, the control unit 11 generates an e-mail address per combination (per alternative) of conference room and use time zone stocked in the storage unit 12 in the processing in step S56, the processing in step S60 or the processing in step S62 in the alternative search processing (FIG. 15). At this time, the control unit 11 generates unique e-mail addresses. Any e-mail address generation method may be employed, and an e-mail address incorporating a conference room number or use time zone may be generated in order to guess the alternative from the e-mail address, or may be generated with a random character string.

Then, the control unit 11 registers data in the reservation management DB 124 and the reply e-mail management DB 125 according to the contents of each alternative (step S21). Specifically, the control unit 11 registers data (conference room. ID of conference room to be temporarily reserved, use time zone, user ID of reservation applicant, number of users, and user ID of other user) in the reservation management DB 124 in order to temporarily reserve each alternative. At this time, the control unit 11 issues a reservation ID. Then, the control unit 11 registers an e-mail address corresponding to each alternative and the previously-issued reservation ID in the reply e-mail management DB 125. At this time, the control unit 11 sets an expiration of the e-mail address and registers it in the reply e-mail management DB 125. Thought not illustrated, the control unit 11 checks the set expiration of the e-mail address as needed, and when the e-mail address is expired, disables the e-mail address and deletes the reservation ID for the temporary reservation corresponding to the e-mail address from the reservation management DB 124 as described above.

Then, the control unit 11 creates a reply e-mail containing the e-mail address generated in step S20 and the contents of the alternative corresponding to the e-mail address (step S22). An exemplary reply e-mail will be described below. Then, the control unit 11 transmits the created reply e-mail to the transmission source (or the e-mail address indicating the transmission source of the reservation application e-mail received in the processing in step S11) (step S23), and terminates the processing in the flowchart.

[4.2. Retransmitted e-Mail Reception Processing]

Figure 17:
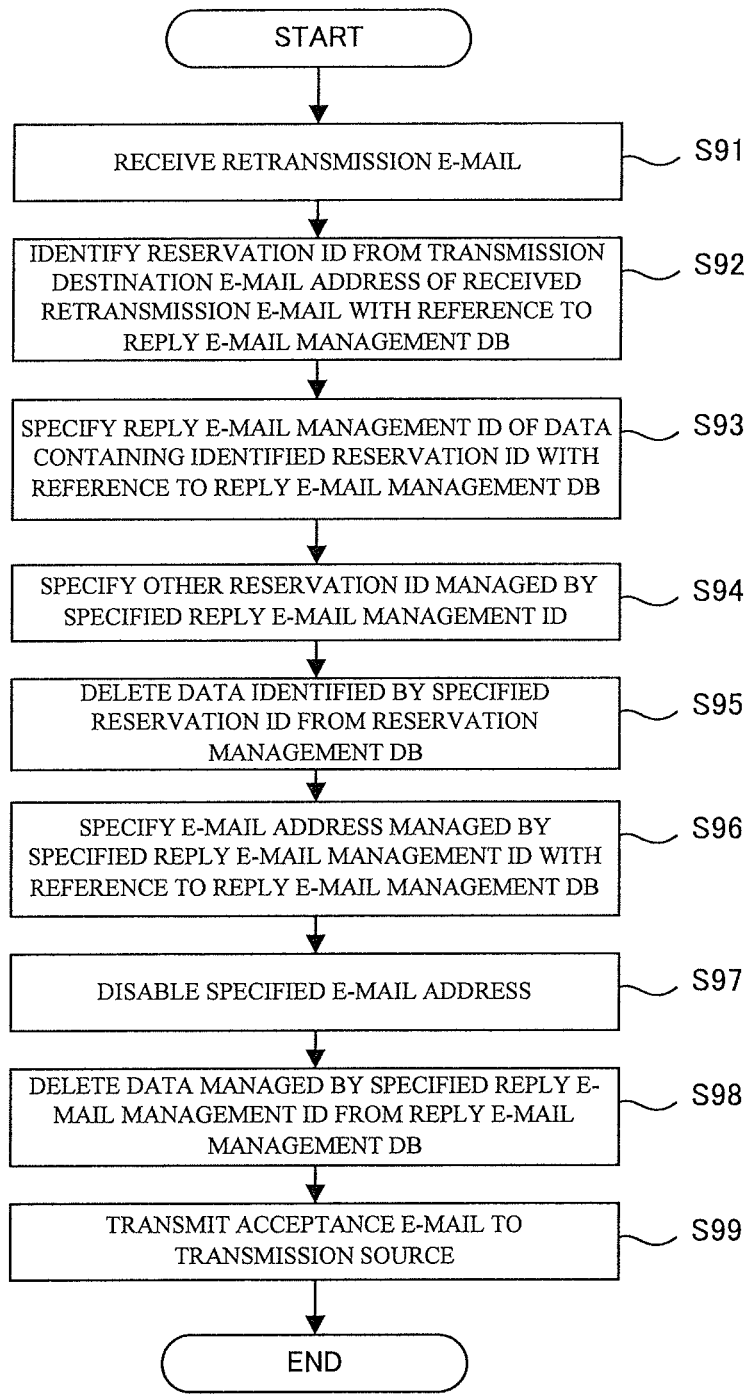
FIG. 17 is a flowchart illustrating an exemplary retransmitted e-mail reception processing by the control unit 11 in the information processing server 1.

A retransmitted e-mail reception processing by the control unit 11 in the information processing server 1 will be described below with reference to FIG. 17 and the like. FIG. 17 is a flowchart illustrating the retransmitted e-mail reception processing by the control unit 11 in the information processing server 1.

The flowchart illustrated in FIG. 17 starts with the step in which the information processing server 1 receives a retransmission e-mail retransmitted from the user terminal UTn of the reservation applicant (step S11), and a flow of transmission of a retransmission e-mail by the reservation applicant after the reply e-mail is transmitted in the acceptance response processing will be described first with reference to FIG. 18 and the like prior to describing the flowchart.

Figure 18:
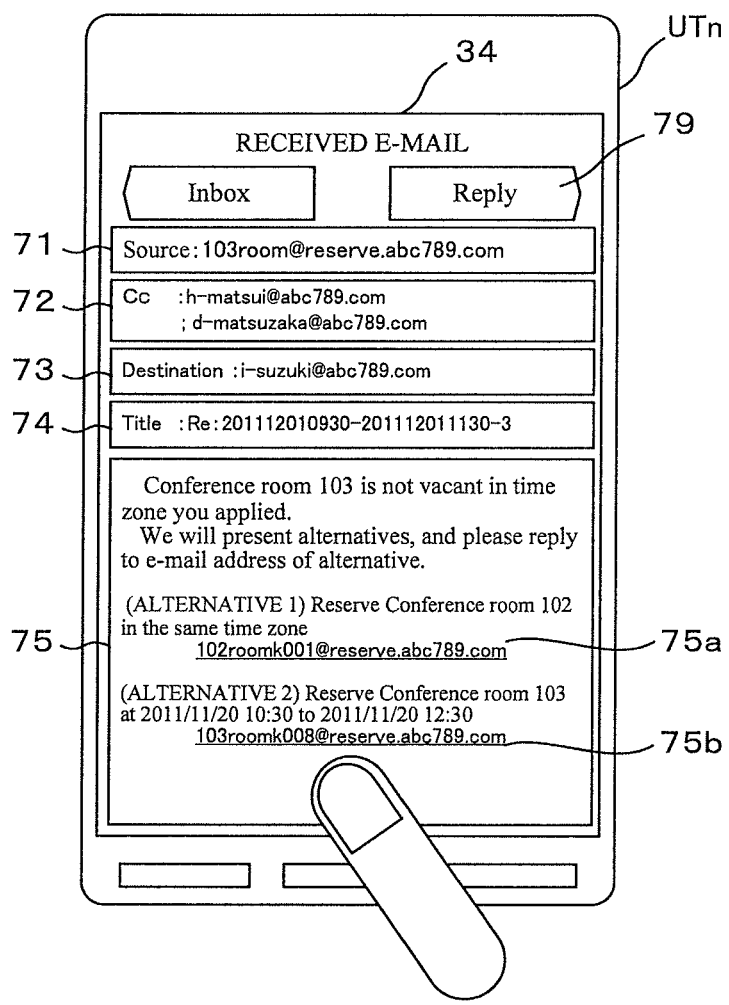
FIG. 18 is a diagram illustrating an exemplary screen when a reply e-mail is displayed.

The contents of the reply e-mail transmitted by the control unit 11 in the information processing server 1 in the processing in step S23 in FIG. 9 are as illustrated in FIG. 18, for example, and are received at the user terminal UTn of the reservation applicant and displayed on the touch panel 34. Transmission source 71 of the reply e-mail may be any e-mail address managed in the information processing server 1, and may employ an e-mail address designated as a destination of the reservation application e-mail, for example. As illustrated in FIG. 18, the control unit 11 may set an e-mail address of a user designated as other user in the reservation application e-mail in Cc 72. In this case, other user can grasp that the reservation applicant has reserved a conference room and the reservation has not been accepted. The control unit 11 sets the e-mail address as the transmission source of the reservation application e-mail in destination 73. Title 74 may be arbitrary, and "Re:" may be added to the header of the title designated in the reservation application e-mail in order to notify a reply e-mail to the reservation application e-mail, for example. Text 75 presents therein an alternative together with a message indicating that the reservation with the contents designated in the reservation application e-mail has not been accepted. Specifically, the contents and e-mail addresses 75*a* and 75*b* are described for the alternatives, respectively. When an acceptable alternative is presented in the alternatives presented to the reservation applicant, the reservation applicant may reply a retransmission e-mail to the e-mail address corresponding to the alternative. On the other hand, when an acceptable alternative is not presented, the reservation applicant leaves the reply e-mail, and then the e-mail address corresponding to the alternative is expired and the temporary reservation of the conference room is also canceled.

As illustrated in FIG. 18, when an acceptable alternative (alternative 2 in the example of FIG. 18) is presented, the reservation applicant designates the e-mail address 75*b* in order to create a retransmission e-mail with the e-mail address 75*b* corresponding to the alternative as a destination. On the other hand, when detecting that the e-mail address 75*b* is designated, the control unit 31 in the user terminal UTn displays an e-mail creation screen with the designated e-mail address as a destination on the touch panel 34 as illustrated in FIG. 19.

Figure 19:
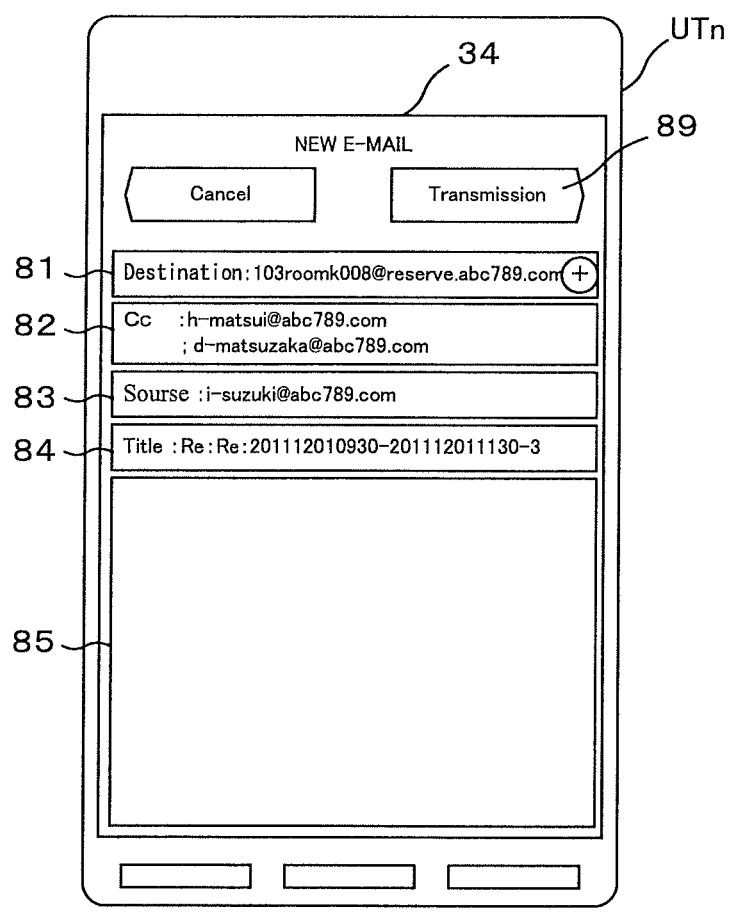
FIG. 19 is a diagram illustrating an exemplary screen when a retransmission e-mail with an e-mail address corresponding to an alternative as a transmission destination is displayed.

As illustrated in FIG. 19, in the reply e-mail (retransmission e-mail) to the reply e-mail from the information processing server 1, destination 81 is set with the e-mail address 75*b* designated by the control unit 31 in the text 75 of the e-mail in FIG. 18. Cc 72 is set with the e-mail address of other user by the control unit 31 in order to cause a user other than the reservation applicant to know the designated alternative similarly to the reply e-mail from the information processing server 1. The transmission source is set with the e-mail address of the reservation applicant by the control unit 31. Title 74 may be arbitrary, and "Re:" may be added to the header of the title of the reply e-mail, for example. The text 75 can describe arbitrary contents therein, and may be blank. Then, the reservation applicant selects a transmission button 89 to transmit the e-mail.

Returning to the flowchart illustrated in FIG. 17, when receiving the retransmission e-mail transmitted from the user terminal UTn as described above (step S91), the control unit 11 in the information processing server 1 identifies the reservation ID from the transmission destination e-mail address of the received retransmission e-mail with reference to the reply e-mail management DB 125 (step S92). Then, the control unit 11 specifies the reply e-mail management ID of the data containing the reservation ID identified in step S92 with reference to the reply e-mail management DB 125 (step S93). Then, the control unit 11 specifies other reservation ID managed by the specified reply e-mail management ID (or the reservation ID corresponding to other alternative proposed in the same reply e-mail) (step S94).

The control unit 11 then deletes the data identified by the reservation ID specified in the processing in step S94 from the reservation management DB 124 (step S95). That is, the control unit 11 leaves only the data managed by the reservation ID corresponding to the alternative designated by the reservation applicant among the alternatives proposed in one item of reply data in the reservation management DB 124 and deletes the data managed by the reservation ID corresponding to other alternative, thereby determining the temporary reservation of the designated alternative as a formal reservation and canceling the temporary reservation of other alternative.

Then, the control unit 11 specifies the e-mail address managed by the reply e-mail management ID specified in the processing in step S93 with reference to the reply e-mail management DB 125 (step S96). At this time, if a plurality of e-mail addresses are managed, the control unit 11 specifies all of them.

Then, the control unit 11 disables the e-mail addresses specified in the processing in step S96 (step S97). Then, the control unit 11 deletes the data managed by the reply e-mail management ID specified in the processing in step S93 from the reply e-mail management DB 125 (step S98). Then, the control unit 11 transmits the acceptance e-mail to the transmission source of the e-mail received in step S91 (step S11) (step S99), and terminates the processing in the flowchart.

As described above, the control unit 11 in the information processing server 1 (exemplary "information processing apparatus") according to the present embodiment receives a reservation application e-mail (exemplary "transmission data") transmitted based on an e-mail address (exemplary "transmission destination information") capable of identifying a conference room (exemplary "application target" or "resource"), identifies the conference room to be reserved from the e-mail address of the received reservation application e-mail, and specifies a use time zone (exemplary "application condition") from the title 65 of the reservation application e-mail. The control unit 11 judges whether the conference room can be reserved ("applied", for example) in the specified use time zone, and when judging that the reservation cannot be accepted, searches alternatives in which at least one of the conference room and the use time zone is changed, generates the e-mail addresses corresponding to the searched alternatives, creates a reply e-mail (exemplary "reply data") containing the generated e-mail addresses and transmits it to the transmission source of the reservation application e-mail. Thereby, even when the conference room to be reserved cannot be reserved, the reply e-mail containing the e-mail addresses capable of identifying the alternatives in which at least one of the conference room and the use time zone is changed is transmitted to the transmission source so that the reservation applicant can easily make a reservation by retransmitting a retransmission e-mail to the transmission source indicated by an e-mail address corresponding to an alternative contained in the reply e-mail.

Conventionally, in some conference room reservation systems, when a reservation applicant designates a conference room number and a use time zone and transmits a reservation application e-mail to an information processing server, either a reservation acceptance e-mail indicating that the reservation is accepted or a reservation refusal e-mail indicating that the reservation cannot be accepted is replied. When receiving the reservation refusal e-mail, the reservation applicant has to transmit a reservation application e-mail with a changed user time zone again. Thus, when the reservation applicant has to reserve a conference room for sure, he/she transmits reservation application e-mails for a plurality of conference rooms at the same time, and the conference rooms whose reservation acceptance e-mails are transmitted are completely reserved. With the method, when a plurality of reservation acceptance e-mails are transmitted (or a plurality of conference rooms can be reserved), the reservations of unnecessary conference rooms have to be canceled, which is troublesome. To the contrary, with the conference room reservation system S according to the present embodiment, some alternatives are contained in a reply e-mail (conventional reservation refusal e-mail) and the e-mail addresses are set for the alternatives, and thus the reservation applicant can completely make a reservation by only transmitting a retransmission e-mail to the e-mail address corresponding to a designated alternative, thereby remarkably enhancing convenience of the reservation applicant. Further, the reply e-mail presents therein the alternatives in consideration of schedules of users other than the reservation applicant, and it is advantageous that the reservation applicant does not need to confirm the schedules of other users.

[5. Variants]

[5.1. Other Exemplary Applications]

[5.1.1. Application to Facility Reservation System for Accepting Reservation of Facility]

The above embodiment is directed for reserving a conference room, but the present invention can be applied to a facility reservation system for reserving other facilities such as a table in a restaurant and a room in a hotel. According to the variant, other user is an accompanying person at the same table as the reservation applicant, or an accompanying person staying at the same room. When the reservation applicant uses a restaurant or hotel alone, other user is not present and the number of users is registered at "one" in the reservation management DB, and no data is registered for a user ID of a user other than the reservation applicant.

[5.1.2. Application to Service Reservation System for Accepting Reservation of Delivery Service]

The present invention is applied to the conference room reservation system S according to the above embodiment, but there will be herein described a variant in which the present invention is applied to a service reservation system for accepting a reservation of a delivery service. The delivery services capable of being reserved in the service reservation system are car repair, key/window glass repair, PC repair, house cleaning, and the like, for example. The variant of the service reservation system will be described below by use of the same reference numerals for the same members as those in the above embodiment, and differences from the above embodiment will be mainly described.

According to the present variant, the storage unit 12 in the information processing server 1 constructs therein a user DB 121A illustrated in FIG. 20 instead of the user DB 121, a service DB 123A illustrated in FIG. 21 instead of the conference room DB 123, and a reservation management DB 124A illustrated in FIG. 22 instead of the reservation management DB 124, and further constructs therein the user schedule DB 122 illustrated in FIG. 4 and the reply e-mail management DB 125 illustrated in FIG. 7.

As illustrated in FIG. 20, the user DB 121A registers (stores) therein name of a user utilizing the service reservation system, e-mail address, address, phone number, credit card information and the like in association with a user ID. The user DB 121A registers therein an e-mail address as a transmission source of an e-mail to be transmitted when the reservation applicant utilizes the service reservation system.

As illustrated in FIG. 21, the service DB 123A registers (stores) therein e-mail address of a service to be reserved in the service reservation system, service name and price, and the like in association with a service ID. The e-mail addresses registered in the service DB 123A are specific to the respective services, and a service can be identified by an e-mail address.

As illustrated in FIG. 22, the reservation management DB 124A registers (stores) therein service ID of a reserved service, reserved use time zone (start time and end time), user ID of reservation applicant and the like in association with a reservation ID. The reservation management DB 124A registers therein data not only when a reservation is determined but also when a temporary reservation is made by the control unit 11. A reservation ID is issued each time data is registered in the reservation management DB 124A.

The user schedule DB 122 and the reply e-mail management DB 125 are substantially the same as in the above embodiment, and thus a description thereof will be omitted.

The acceptance response processing in the present variant will be described below with reference to FIG. 9. At first, when a reservation applicant wants to reserve a delivery service, he/she activates the address book software in the user terminal UTn to designate an e-mail address corresponding to a delivery service desired to reserve from the address book, and transmits a reservation application e-mail in which a use time zone is filled in the title or the text to the designated e-mail address. To the contrary, the control unit 11 in the information processing server 1 receives the reservation application e-mail (step S11), and then identifies the service (service ID) from the transmission destination e-mail address of the received reservation application e-mail with reference to the service DB 123A (step S12). Then, the control unit 11 performs the processing in step S13 and specifies a use time zone from the reservation application e-mail (step S14). The control unit 11 does not perform the processing in step S15 in the present variant.

The control unit 11 then performs the acceptance judgment processing (step S16). A detailed description of the acceptance judgment processing according to the present variant will be omitted, but the control unit 11 judges whether the service identified in the processing in step S12 can be provided or the reservation can be accepted in the use time zone designated by the reservation applicant. Then, when judging that the reservation cannot be accepted (step S17: NO), the control unit 11 performs the alternative search processing (step S19). A detailed description of the alternative search processing according to the present variant will be omitted, but the control unit 11 searches alternatives in which the use time zone designated by the reservation applicant is changed to a use time zone in which the delivery service can be provided (can be reserved). At this time, the control unit 11 preferably presents the use time zones in which the reservation applicant is free as alternatives with reference to the user schedule DB 122. The control unit 11 generates the e-mail addresses corresponding to the thus-searched alternatives (step S20), performs the processing in step S21 and the processing in step S22, and transmits a reply e-mail to the transmission source of the reservation application e-mail (step S23).

[5.1.3. Application to Product Order System for Accepting Order of Product]

There will be described below a variant in which the present invention is applied to a product order system for accepting an order of a product. In the following, in the description of the variant of the product order system, the same reference numerals are denoted to the same members as those in the above embodiment, and differences from the above embodiment will be mainly described. The product order system is suitably used when an orderer orders a continuously-purchasing product. In this case, the orderer can order a product by only registering an e-mail address corresponding to the product in the address book and transmitting an e-mail to the e-mail address. If an e-mail magazine describing a product and an e-mail address corresponding to the product therein is set to be transmitted to the user terminal UTn of the orderer, the orderer can order the product by only transmitting an e-mail to an e-mail address corresponding to a preferred product in the e-mail magazine.

According to the present variant, a storage unit in an information processing server in the product order system constructs therein the user DB 121A illustrated in FIG. 20 instead of the user DB 121, a product DB 123B illustrated in FIG. 23 instead of the conference room DB 123, an order management DB 124B illustrated in FIG. 24 instead of the reservation management DB 124, and a reply e-mail management DB 125B illustrated in FIG. 25 instead of the reply e-mail management DB 125, and further constructs therein the user schedule DB 122 illustrated in FIG. 4.

As illustrated in FIG. 23, the product DB 123B registers (stores) therein e-mail address of a product to be ordered in the product order system, product name, price, number of stocks and the like in association with a product ID. The e-mail addresses registered in the product DB 123B are specific to the respective products, and a product can be identified from an e-mail address. The number of stocks corresponds to the number of orderable products, and if the number of stocks is zero, neither temporary order nor formal order can be made.

As illustrated in FIG. 24, the order management DB 124B registers (stores) therein product ID of an ordered product, number of ordered products, delivery date/delivery time zone, user ID of orderer, and the like in association with an order ID. The order management DB 124B registers therein data not only when an order is completely made but also when a temporary order is made by the control unit 11. An order ID is issued each time data is registered in the order management DB 124B.

As illustrated in FIG. 25, the reply e-mail management DB 125B registers (stores) therein an e-mail address generated per alternative by the control unit 11 (e-mail address corresponding to an alternative), an expiration of the e-mail address, an order ID of temporary order of each alternative (order ID corresponding to the alternative), and the like in association with a reply e-mail management ID. The control unit 11 temporarily orders an alternative (registers data corresponding to an alternative in the order management DB 124B), and registers a then-issued order ID in the reply e-mail management DB 125B per alternative. At this time, when one reply e-mail contains a plurality of alternatives, an e-mail address and an order ID are registered per alternative. On the other hand, when an expired e-mail address is present, the control unit 11 disables use of the e-mail address, and deletes the data identified by the order ID associated with the e-mail address in the reply e-mail management DB 125B from the order management DB 124B in order to cancel the temporary order corresponding to the e-mail address. Thereby, the temporary order of the product which is not formally ordered by the expiration of the e-mail address is canceled, and thus the temporally-ordered product does not keep temporarily ordered, thereby reducing a possibility that other orderer cannot make an order.

The user schedule DB 122 is substantially the same as in the above embodiment, and thus a description thereof will be omitted. The user DB 121A is substantially the same as in the variant of the service reservation system, and thus a description thereof will be omitted.

Figure 26:
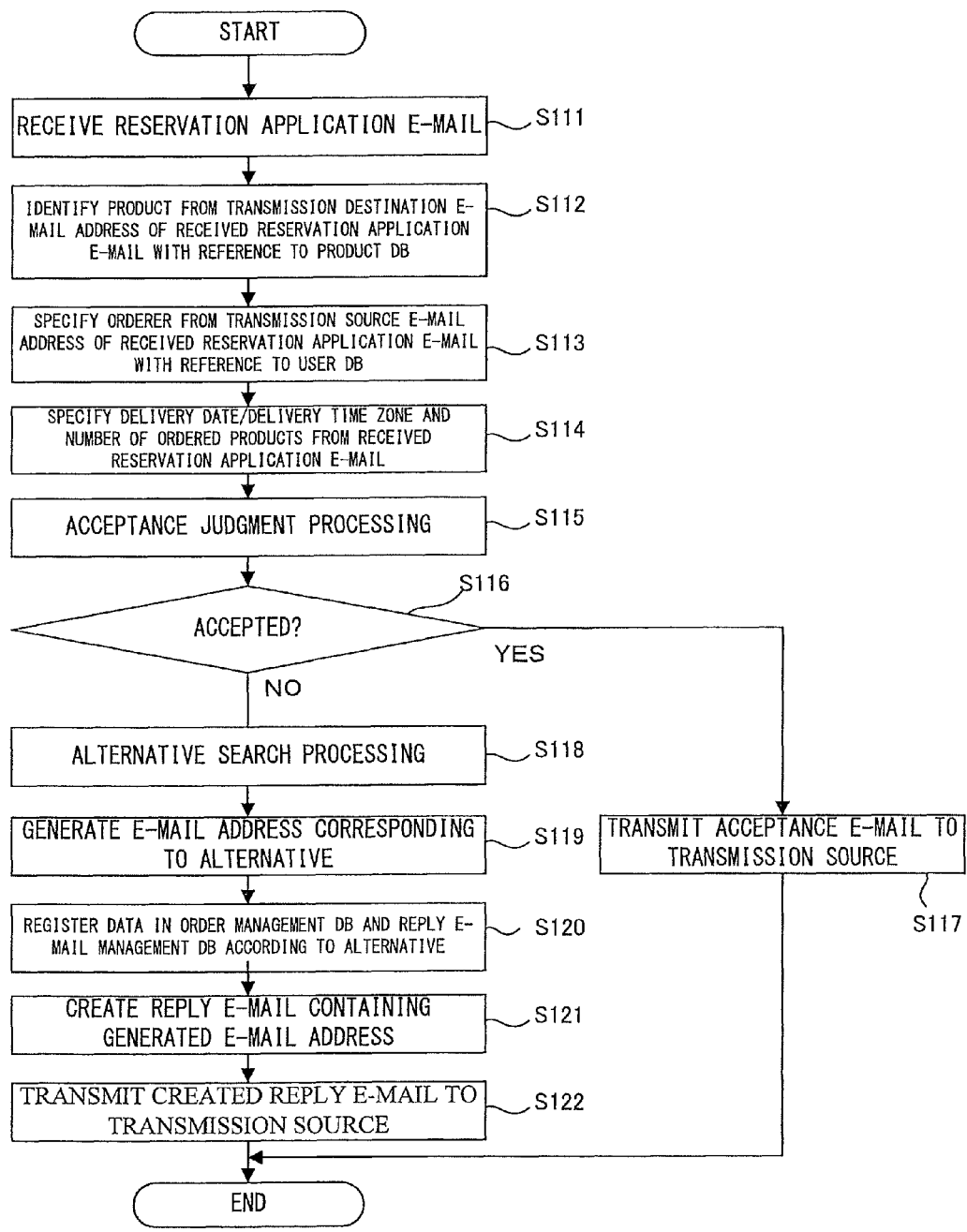
FIG. 26 is a flowchart illustrating an exemplary acceptance response processing by the control unit 11 in the information processing server 1 according to the variant.

The acceptance response processing according to the present variant will be described below with reference to FIG. 26. In the present variant, when an orderer wants to order a product, he/she activates the address book software in the user terminal UTn to select an e-mail address corresponding to the product to be ordered from the address book, and transmits an order application e-mail in which the number of ordered products and the delivery date/delivery time zone are filled in the title or text to the selected e-mail address. To the contrary, the control unit 11 in the information processing server 1 receives the order application e-mail from the user terminal UTn (step S111). Then, the control unit 11 identifies the product (product ID) from the transmission destination e-mail address of the received order application e-mail with reference to the product DB 123B (step S112). Then, the control unit 11 specifies the orderer from the transmission source e-mail address of the order application e-mail with reference to the user DB 121A (step S113). Then, the control unit 11 specifies the delivery date/delivery time zone and the number of ordered products from the order application e-mail (step S114).

Then, the control unit 11 performs the acceptance judgment processing (step S115). A detailed description of the acceptance judgment processing according to the present variant will be omitted, but the control unit 11 judges whether a designated number of ordered products can be shipped in the delivery date/delivery time zone designated by the orderer or whether the order can be accepted. Then, when judging that the order can be accepted (step S116: YES), the control unit 11 transmits an acceptance e-mail to the transmission source (step S117), and terminates the processing in the flowchart. On the other hand, when judging that the order cannot be accepted (step S116: NO), the control unit 11 performs the alternative search processing (step S118). A detailed description of the alternative search processing according to the present variant will be omitted, but the control unit 11 searches alternatives in which at least one of the ordered product, the number of ordered products and the delivery date/delivery time zone designated by the orderer is changed thereby to accept the order. At this time, the control unit 11 preferably presents the delivery dates/delivery time zones in which the schedules of the orderer are not made with reference to the user schedule DB 122. The control unit 11 generates the e-mail addresses corresponding to the thus-searched alternatives (step S119).

Then, the control unit 11 registers the data in the order management DB 124B and the reply e-mail management DB 125B according to each alternative (step S120). Specifically, the control unit 11 registers the data (product ID of a product to be temporarily ordered, number of ordered products, delivery date/delivery time zone, and orderer's user ID) in the order management DB 124B in order to make a temporary order per alternative. At this time, the control unit 11 issues an order ID. The control unit 11 subtracts the maximum number of ordered products from the number of stocks in the product DB 123B in order to ship the products for sure also when an alternative in which the number of ordered products is maximum is designated among the alternatives. When the temporary order is determined or when all the temporary orders are canceled, the control unit 11 adjusts the number of stocks to be correct. Then, the control unit 11 registers an e-mail address corresponding to each alternative and a previously-issued order ID in the reply e-mail management DB 125B. At this time, the control unit 11 sets an expiration of the e-mail address and registers it in the reply e-mail management DB 125B. Though not illustrated, the control unit 11 checks the set expiration of the e-mail address as needed, and when an expired e-mail address is present, disables the e-mail address and deletes the order ID for the temporary order corresponding to the e-mail address from the order management DB 124B as described above.

Then, the control unit 11 creates a reply e-mail containing the e-mail address generated in step S119 and the contents of the alternative corresponding to the e-mail address (step S121), transmits it to the transmission source (or the e-mail address indicating the transmission source of the order application e-mail received in the processing in step S111) (step S122), and terminates the processing in the flowchart.

Figure 27:
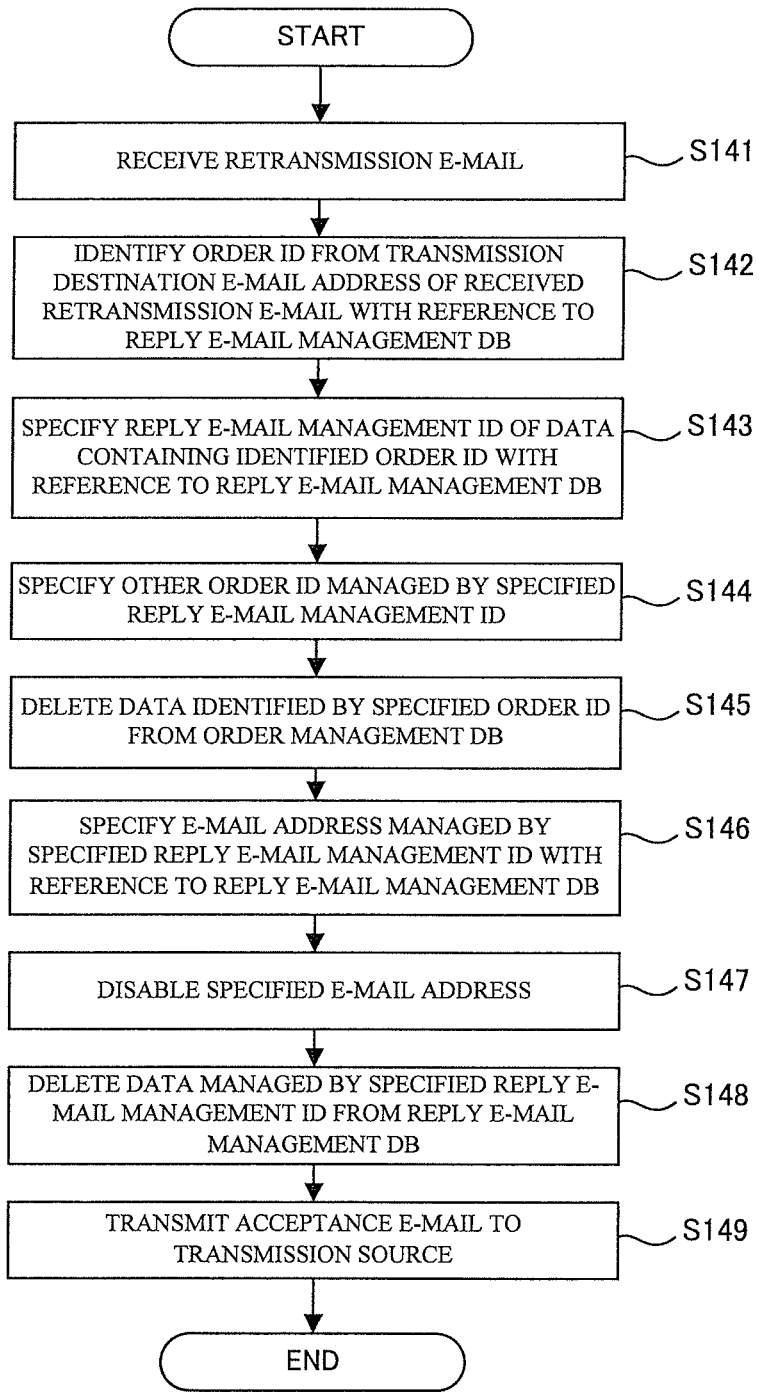
FIG. 27 is a flowchart illustrating an exemplary retransmitted e-mail reception processing by the control unit 11 in the information processing server 1 according to the variant.

The retransmitted e-mail reception processing according to the present variant will be described below with reference to FIG. 27. When receiving a retransmission e-mail transmitted from the user terminal UTn (step S141), the control unit 11 in the information processing server 1 identifies the order ID from the transmission destination e-mail address of the received retransmission e-mail with reference to the reply e-mail management DB 125B (step S142). Then, the control unit 11 specifies the reply e-mail management ID of the data containing the order ID identified in step S142 with reference to the reply e-mail management DB 125B (step S143). Then, the control unit 11 specifies other order ID managed with the specified reply e-mail management ID (or order ID corresponding to other alternative proposed in the same reply e-mail) (step S144).

Then, the control unit 11 deletes the data identified by the order ID specified in the processing in step S144 from the order management DB 124B (step S145). That is, the control unit 11 leaves only the data managed by the order ID corresponding to the alternative designated by the orderer among the alternatives proposed in one item of reply data in the order management DB 124B, and deletes the data managed by the order IDs corresponding to other alternatives, thereby determining the temporary order of the designated alternative as a formal order and canceling the temporary orders of other alternatives.

Then, the control unit 11 specifies the e-mail address managed by the reply e-mail management ID specified in the processing in step S143 with reference to the reply e-mail management DB 125B (step S146). Then, the control unit 11 disables the e-mail address specified in the processing in step S146 (step S147). Then, the control unit 11 deletes the data managed by the reply e-mail management ID specified in the processing in step S143 from the reply e-mail management DB 125B (step S148). Then, the control unit 11 transmits an acceptance e-mail indicating that the alternative designated by the orderer is accepted to the transmission source of the e-mail received in step S141 (step S111) (step S149), and terminates the processing in the flowchart.

The present variant is configured such that an orderer designates a delivery date/delivery time zone or the number of ordered products in an order application e-mail, but may be simply configured such that a delivery date/delivery time zone cannot be designated and only one product can be ordered per one order. With the structure, the items of number of ordered products and delivery date/delivery time zone do not need to be provided in the order management DB 124B.

With the structure, an orderer transmits an order application e-mail with an e-mail address corresponding to an ordered product as a transmission destination to the information processing server 1. The title or text in the order application e-mail at this time may be blank. When receiving the order application e-mail, the control unit 11 in the information processing server 1 identifies the ordered product from the transmission destination e-mail address with reference to the product DB 123B, and specifies the orderer from the transmission source e-mail address with reference to the user DB 121A. Then, the control unit 11 judges whether the order can be accepted (or whether the ordered product is in stock) with reference to the product DB 123B. Then, when judging that the order cannot be accepted, the control unit 11 searches other products as alternatives whose order can be accepted. Then, the control unit 11 acquires the e-mail addresses corresponding to the products of the searched alternatives from the product DB 123, and then creates a reply e-mail containing the acquired e-mail addresses and transmits it to the transmission source of the order application e-mail. The control unit 11 registers data according to each alternative in the order management DB 124B.

[5.2. SMS Data Communication]

The data exchange between the user terminal UTn and the information processing server 1 employs e-mails in the above embodiment, but other unidirectional communication means such as SMS may be employed instead.

[5.3. Reply e-Mail for Designating e-Mail Address and Use Time Corresponding to Conference Room]

The above embodiment is configured such that the control unit 11 in the information processing server 1 generates an e-mail address per alternative (combination of conference room and use time zone) and receives a retransmission e-mail to any e-mail address thereby to identify the alternative (reservation ID) designated by the reservation applicant, but there may be configured instead such that the conference room of the alternative designated by the reservation applicant is identified by the e-mail address and the use time zone of the alternative is specified by the title or the like. In this case, for example, a reply e-mail as illustrated in FIG. 28 is transmitted to the user terminal UTn and the reservation applicant creates and transmits a retransmission e-mail based on the reply e-mail.

Figure 28:
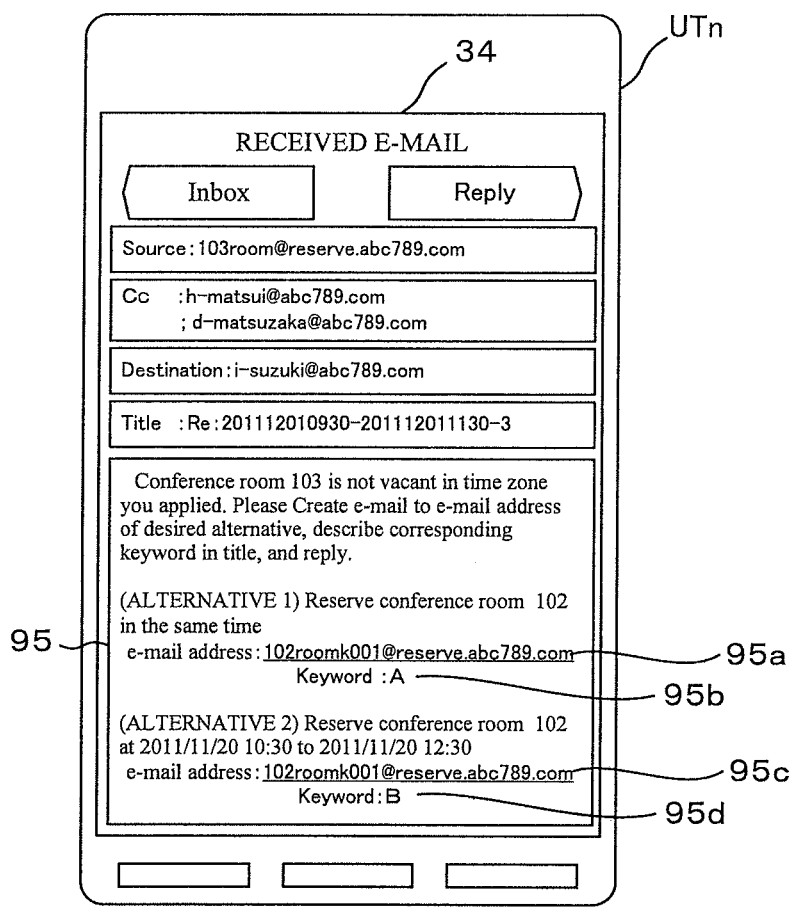
FIG. 28 is a diagram illustrating an exemplary screen when a reply e-mail is displayed according to the variant.
Figure 29:
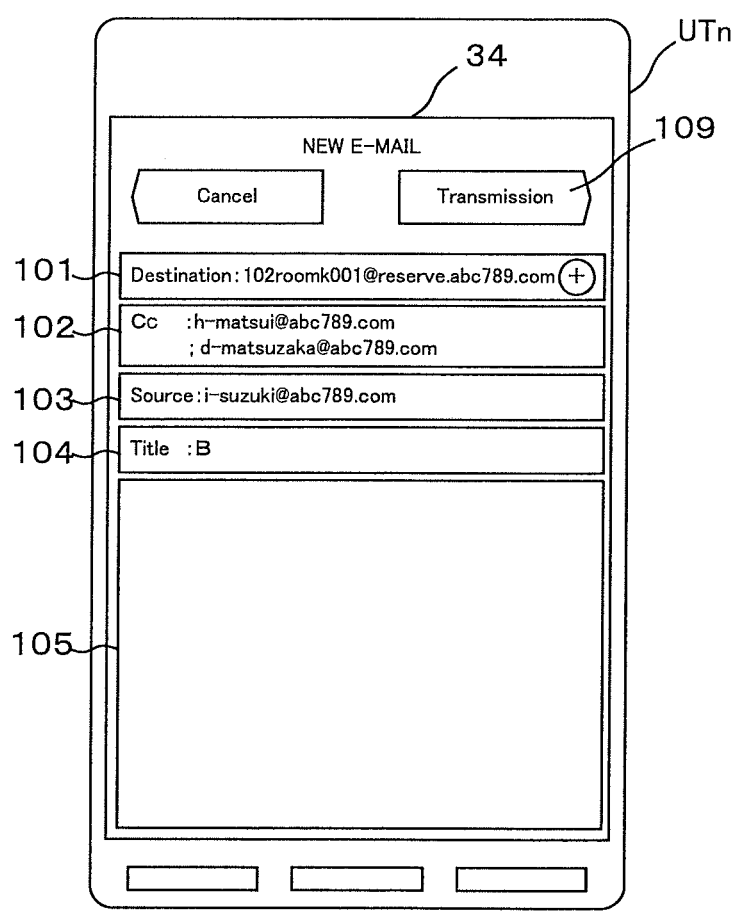
FIG. 29 is a diagram illustrating an exemplary screen when a retransmission e-mail created based on an alternative is displayed according to the variant.

Text 95 of the reply e-mail illustrated in FIG. 28 describes therein reply e-mail addresses 95a, 95c and the keywords 95b, 95d for two alternatives searched by the control unit 11, respectively. When an acceptable alternative is presented, the reservation applicant creates a retransmission e-mail to the e-mail address corresponding to the alternative, describes the keyword corresponding to the alternative in the title, and transmits it. For example, when designating the alternative 2, the reservation applicant designates the e-mail address 95c in order to create a retransmission e-mail to the e-mail address 95c. On the other hand, when detecting that the e-mail address 95c is designated, the control unit 31 in the user terminal UTn displays an e-mail creation screen destined to the designated e-mail address on the touch panel 34 as illustrated in FIG. 29. The e-mail address 95c corresponding to the alternative presented in the text 95 of the e-mail in FIG. 28 is set in destination 101 by the control unit 31 in the retransmission e-mail illustrated in FIG. 29. The reservation applicant describes the keyword "B" corresponding to the alternative 2 in the title, and selects a transmission button 109 to transmit the e-mail.

Then, when receiving the retransmission e-mail, the control unit 11 in the information processing server 1 identifies the conference room ID from the transmission destination e-mail address of the retransmission e-mail and specifies the use time zone from the title. Then, the control unit 11 identifies the reservation ID based on the identified conference room ID and the specified use time zone with reference to the reservation management DB 124. Then, the control unit 11 specifies the reply e-mail management ID registering the identified reservation ID therein from the reply e-mail management DB, disables all the e-mail addresses managed by the specified reply e-mail management ID, and cancels the temporary reservations for the reservation IDs corresponding to other alternatives.

Figure 30:
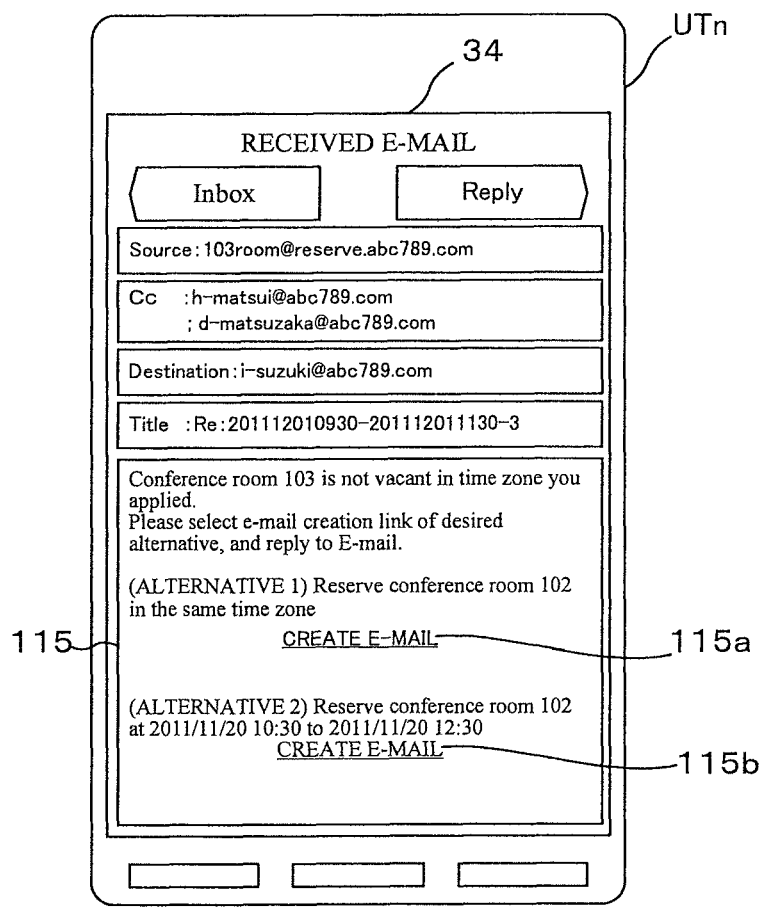
FIG. 30 is a diagram illustrating an exemplary screen when a reply e-mail is displayed according to the variant.

There has been described herein the case in which the control unit 11 creates the reply e-mail as illustrated in FIG. 28, but a HTML (HyperText Markup Language) reply e-mail as illustrated in FIG. 30 may be created instead.

Text 115 in the reply e-mail illustrated in FIG. 30 describes therein e-mail creation links 115a and 115b for two alternatives searched by the control unit 11, respectively. The e-mail creation links 115a and 115b are based on the description of HTML tags (exemplary "auxiliary data"), and when the e-mail creation link 115a is designated by the reservation applicant, the e-mail creation screen is opened so that the e-mail address corresponding to the alternative 1 is set in the destination of the retransmission e-mail and the keyword "A" is set in the title. Similarly, when the e-mail creation link 115a is designated by the reservation applicant, the e-mail creation screen is opened so that the e-mail address corresponding to the alternative 2 is set in the destination of the retransmission e-mail and the keyword "B" is set in the title as illustrated in FIG. 29. When the HTML e-mail is used in this way, the reservation applicant does not need to describe a keyword in the title by his/herself, and can create a retransmission e-mail by only designating the e-mail creation link 115a or 115b corresponding to an alternative, thereby easily transmitting the retransmission e-mail.

[5.4. Management of Temporary Reservation]

The above embodiment is configured such that the control unit 11 in the information processing server 1 registers data corresponding to an alternative in the reservation management DB 124 when the alternative is temporarily reserved, and cancels a temporary reservation by leaving only formally-reserved data and deleting other items of data, but there may be configured instead such that a cancel flag is provided to an item in the reservation management DB 124 and the cancel flag is OFF when data is registered and a cancel flag remains OFF only for data corresponding to a formal reservation when the formal reservation is made, while a cancel flag of data (data to be canceled) corresponding to other alternative is changed to ON thereby to identify which alternative (temporary reservation) is formally reserved and which alternative (temporary reservation) is canceled.

REFERENCE SIGNS LIST

1: Information processing server
11: Control unit
12: Storage unit
121: User DB
122: User schedule DB
123: Conference room DB
124: Reservation management DB
125: Reply e-mail management DB
13: Communication unit
14: I/O interface unit
15: System bus
UTn: User terminal
31: Control unit
32: Storage unit
33: Communication unit
34: Touch panel
NW: Network

The invention claimed is:
1. An information processing apparatus comprising:
a receiving unit that receives transmission data containing an application condition and identification information identifying other application target to be applied with an application target, destined to transmission destination information identifying the application target and transmitted in unidirectional communication;

a search unit that, when an application of the application target identified by the transmission destination information of the transmission data received by the receiving unit cannot be accepted under the application condition contained in the transmission data, searches an acceptable alternative in which the application target and the other application target can be accepted under the same condition without changing the other application target;

a reply data creation unit that creates reply data containing the transmission destination information identifying the alternative searched by the search unit; and a transmission unit that transmits the reply data created by the reply data creation unit to the transmission source of the transmission data, wherein the application target is a specific resource, the other application target is a resource being used by a plurality of users, the application condition is a use period containing a use start time/date and a use end time/date of the resource, and when a judgment is made as to whether the other application target can be accepted under the same application condition, the search unit assumes, as an application condition, at least either the use start time/date a predetermined time earlier or the use end time/date a predetermined time later.

2. The information processing apparatus according to claim 1, wherein the receiving unit further receives retransmission data destined to the transmission destination information as the first information identifying the alternative, and the apparatus further includes an application acceptance unit that accepts an application of an application target of the alternative identified by the transmission destination information of the retransmission data received by the receiving unit.

3. The information processing apparatus according to claim 2, further comprising:

a temporary application registration unit that registers a temporary application of the application target of the alternative identified by the transmission destination information contained in the created reply data; and a temporary application cancel unit that cancels the temporary application after a predetermined time elapses since the temporary application is registered, wherein when the application target of the alternative identified by the transmission destination information of the retransmission data received by the receiving unit is temporarily registered, determines the temporary application as a formal application.

4. The information processing apparatus according to claim 3, wherein the reply data creation unit creates reply data containing a plurality of items of transmission destination information identifying alternatives, the temporary application registration unit registers a temporary application of an application target of each alternative identified by transmission destination information contained in the created reply data, and when the application target temporarily registered by the application acceptance unit is determined as a formal application, the temporary application cancel unit cancels a temporary application of other application target temporarily registered at the same time with the application target.

5. The information processing apparatus according to claim 1, wherein the alternative contains application conditions, and the transmission destination information as the first information contains information by which the applicant can guess an application condition.

6. The information processing apparatus according to claim 5, further comprising:

a transmission destination information management unit that can receive retransmission data destined to the transmission destination information generated by the reply data creation unit and cannot receive retransmission data destined to the generated transmission destination information after a predetermined time elapses.

7. The information processing apparatus according to claim 1, wherein the reply data creation unit, when the application of the application target identified by the transmission destination information of the transmission data received by the receiving unit cannot be accepted, creates reply data which contains the alternative based on the alternative so that further replying to the reply data enables an application with the alternative.

8. The information processing apparatus according to claim 1, wherein the alternative contains application conditions, the reply data created by the reply data creation unit further contains auxiliary data for assisting in creating retransmission data containing an application condition to be designated by an applicant among application conditions contained in the reply data, and the auxiliary data sets first information related to the alternative in the destination of the retransmission data and sets second information related to the alternative in the title of the retransmission data.

9. The information processing apparatus according to claim 1, wherein the search unit searches the acceptable alternative in which at least one of the application target and the application condition is changed.

10. The information processing apparatus according to claim 1, wherein when the application target identified by the transmission destination information of the transmission data received by the receiving unit and other application target identified by the identification information contained in the transmission data cannot be accepted under the application condition contained in the transmission data, the search unit searches the acceptable alternative.

11. The information processing apparatus according to claim 1, wherein when the application target identified by the transmission destination information of the transmission data received by the receiving unit and other application target identified by the identification information contained in the transmission data cannot be accepted under the application condition contained in the transmission data, the search unit searches the acceptable alternative in which at least one of the application target and the application condition is changed, the reply data creation unit, when the application of the application target identified by the transmission destination information of the transmission data received by the receiving unit cannot be accepted, creates reply data which contains the alternative based on the alternative so that further replying to the reply data enables an application with the alternative, the alternative contains application conditions, the reply data created by the reply data creation unit further contains auxiliary data for assisting in creating retransmission data containing an application condition to be designated by an applicant among application conditions contained in the reply data, and the auxiliary data sets first information related to the alternative in the destination of the retransmission data and sets second information related to the alternative in the title of the retransmission data.

12. The information processing apparatus according to claim 11, wherein the application target is a specific resource, the other application target is a plurality of users utilizing the resource, the application condition is a use period containing a use start time/date and a use end time/date of the resource, and when a judgment is made as to whether the other application target can be accepted under the same application condition, the search unit assumes, as an application condition, at least either the use start time/date a predetermined time earlier and the use end time/date a predetermined time later.

13. An information processing method performed by a computer, comprising:

a receiving step of receiving transmission data containing an application condition and identification information identifying other application target to be applied with an application target, destined to transmission destination information identifying the application target and transmitted in unidirectional communication;

a search step of, when an application of the application target identified by the transmission destination information of the transmission data received by the receiving unit cannot be accepted under the application condition contained in the transmission data, searching an acceptable alternative in which the application target and the other application target can be accepted under the same condition without changing the other application target;

a reply data creation step of creating reply data containing the transmission destination information identifying the alternative searched in the search step; and a transmission step of transmitting the reply data created in the reply data creation step to the transmission source of the transmission data, wherein the application target is a specific resource, the other application target is a resource being used by a plurality of users, the application condition is a use period containing a use start time/date and a use end time/date of the resource, and when a judgment is made as to whether the other application target can be accepted under the same application condition, the search unit assumes, as an application condition, at least either the use start time/date a predetermined time earlier or the use end time/date a predetermined time later.

* * * * *